United States Patent
Crawford et al.

(10) Patent No.: US 11,905,465 B2
(45) Date of Patent: Feb. 20, 2024

(54) ZWITTERIONIC COMPOUNDS FOR NON-LINEAR OPTICS, SENSORS, AND SPECTROSCOPY

(71) Applicant: UNIVERSITY OF CENTRAL FLORIDA RESEARCH FOUNDATION, INC., Orlando, FL (US)

(72) Inventors: Kaitlyn E. Crawford, Orlando, FL (US); Gavin S. Mohammad-Pour, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 91 days.

(21) Appl. No.: 17/744,259

(22) Filed: May 13, 2022

(65) Prior Publication Data
US 2022/0389306 A1    Dec. 8, 2022

Related U.S. Application Data

(60) Provisional application No. 63/188,243, filed on May 13, 2021.

(51) Int. Cl.
| | | |
|---|---|---|
| C09K 9/02 | (2006.01) | |
| C09B 11/20 | (2006.01) | |
| C08K 5/3432 | (2006.01) | |
| G02F 1/361 | (2006.01) | |

(52) U.S. Cl.
CPC ............. *C09K 9/02* (2013.01); *C08K 5/3432* (2013.01); *C09B 11/20* (2013.01); *C08K 2201/001* (2013.01); *G02F 1/3615* (2013.01)

(58) Field of Classification Search
CPC ................................ C09B 11/24; C09K 9/02
See application file for complete search history.

(56) References Cited

PUBLICATIONS

Piao, Xianqing et al., "Nonlinear Optical Side-Chain Polymers Post-Functionalized with High-b Chromophores Exhibiting Large Electro-Optic Property", Journal of Polymer Science Part A Polymer Chemistry, Jan. 2011, vol. 49, pp. 47-54.
Priimagi, Arri et al., "Suppression of Chromophore Aggregation in Amorphous Polymeric Materials: Towards More Efficient Photoresponsive Behavior", Journal of Nonlinear Optical Physics & Materials, 2010, vol. 19, No. 1, pp. 57-73.
Robinson, B.H. et al., "The molecular and supramolecular engineering of polymeric electro-optic materials", Chemical Physics, 1999, vol. 245, pp. 35-50.
Schlenoff, Joseph B., "Zwitteration: Coating Surfaces with Zwitterionic Functionality to Reduce Nonspecific Adsorption", Langmuir, 2014, vol. 30, pp. 9625-9636.

(Continued)

*Primary Examiner* — Khanh T Nguyen
(74) *Attorney, Agent, or Firm* — Timothy H. Van Dyke; WOLTER, VAN DYKE, DAVIS, PLLC.

(57) ABSTRACT

Disclosed are new zwitterionic compounds having a bridge moiety, an electron acceptor moiety, and an electron donor moiety. The bridge moiety is covalently bonded to both the electron acceptor moiety and to the electron donor moiety. The bridge moiety includes one selected from xanthene and thioxanthene, and the acceptor moiety includes a pyridinium moiety, and the donor moiety includes a malononitrile moiety.

9 Claims, 6 Drawing Sheets

(56) References Cited

PUBLICATIONS

Shi, Yanrong et al., "Ultra-High-Response, Multiply Twisted Electro-optic Chromophores: Influence of System Elongation and Interplanar Torsion on Hyperpolarizability", J. Am. Chem. Soc., 2015, vol. 137, pp. 12521-12538.

Solà, Miquel, "Forty years of Clar's aromatic p-sextet rule", Frontiers in Chemistry, Oct. 2013, vol. 1, article 22, pp. 1-8.

Song, Naiheng et al., "Cross-Linkable Zwitterionic Polymides with High Electrooptic Coefficients at Telecommunication Wavelengths", Chem Mater., 2004, vol. 16, pp. 3708-3713.

Spring, Andrew M. et al., "Adamantyl and carbazole containing trans-poly(norbornene-dicarboximide)s as electro-optic chromophore hosts", Manuscript, 2019, 32 pages.

Stukalin, Evgeny B. et al., "Plasticization and antiplasticization of polymer melts diluted by low molar mass species", The Journal of Chemical Physics, Feb. 2010, 13 pages.

Sun, Jian et al., "Design and fabrication of DR1/PC-based electro-optic switch", Modern Physics Letters B, 2015, vol. 29, No. 14, 9 pages.

Suponitsky, Kyrill Yu. et al., "Electronic Hyperpolarizabilities for Donor-Acceptor Molecules with Long Conjugated Bridges: Calculations versus Experiment", J. Phys. Chem. A., 2009, vol. 113, pp. 10994-11001.

Thoradarson, Pall, "Binding Constants and Their Measurement", Techniques, 2012, pp. 240-273.

Vapaavuori, Jaana et al., "Supramolecular design principles for efficient photoresponsive polymer-azobenzene complexes", J. Mater. Chem. C, 2018, vol. 6, pp. 2168-2188.

Weder, Christoph et al., "Orientational Relaxation in Electric_Field-Poled Films from Main-Chain Nonlinear Optical Polyamides", Macromolecules, 1995, vol. 28, pp. 2377-2382.

White, Ronald P. et al., "Polymer Free Volume and Its Connection to the Glass Transition", Macromolecules 2016, vol. 49, pp. 3987-4007.

White, Michael E. et al., "Organic NLO Polymers. 2. A Study of Main-Chain and Guest-Host x(2) NLO Polymers: NLO-phore Structure Versus Poling", Macromolecules, 1994, vol. 27, pp. 3009-3015.

Wu, Jieyun et al., "Ultra-efficient and stable electro-optic dendrimers containing supramolecular homodimers of semifluorinated dipolar aromatics", Materials Chemistry Frontiers, Jan. 2018, vol. 2, No. 5, pp. 901-909.

Wu, Wenbo et al., "Introduction of an Isolation Chromophore into an "H"-Shaped NLO Polymer: Enhanced NLO Effect, Optical Transparency, and Stability", ChemPlusChem., 2013, vol. 78, pp. 1523-1529.

Wu, Jieyun et al., "Synthesis of novel nonlinear optical chromophore to achieve ultrahigh electro-optic activity", Chem. Commun., 2012, vol. 48, pp. 9637-9639.

Wurthner, Frank et al., "ATOP Dyes. Optimization of a Multifunctional Merocyanine Chromophore for High Refractive Index Modulation in Photorefractive Materials", J. Am. Chem. Soc., 2001, vol. 123, pp. 2810-2824.

Xu, Huajun et al., "Molecular Engineering of Structurally Diverse Dendrimers with Large Electro-Optic Activities", ACS Appl. Mater. Interfaces, 2019, vol. 11, pp. 21058-21068.

Xu, Huajun et al., "Self-assembled binary multichromophore dendrimers with enhanced electro-optic coefficients and alignment stability", Mater. Chem. Front., vol. 2020, vol. 4, pp. 168-175.

Yang, Yuhui et al., "Synthesis and Optical Nonlinear Property of Y-type Chromophores Based on Double-Donor Structure with Excellent Electro-Optic Activity", Journal of Materials Chemistry C, 2013, 11 pages.

Zhang, Michael C. et al., "A Review on Polymer Crystallization Theories", Crystals, 2017, vol. 7, No. 4, 37 pages.

Zhang, Cheng et al., "Electric Poling and Relaxation of Thermoset Polyurethane Second-Order Nonlinear Optical Materials: Role of Cross-Linking and Monomer Rigidity", Macromolecules, 2001, vol. 34, pp. 235-243.

Zhang, Xingyu et al., "High Performance Optical Modulator Based on Electro-Optic Polymer Filled Silicon Slot Photonic Crystal Waveguide", Journal of Lightwave Technology, Jun. 15, 2016, vol. 34, No. 12, pp. 2941-2951.

Zhang, Xingyu et al., "Electric field sensor based on electro-optic polymer refilled silicon slot photonic crystal waveguide coupled with bowtie antenna", Proc. of SPIE, 2013, vol. 8624, 8 pages.

Zhoa, Yan et al.,"The M06 suite of density functionals for main group thermochemistry, thermochemical kinetics, noncovalent interactions, excited states, and transition elements: two new functionals and systematic testing of four M06-class functionals and 12 other functionals" Theor Chem Account, 2008, vol. 120, pp. 215-241.

Zhou, Xing-Hua et al., "Supramolecular Self-Assembled Dendritic Nonlinear Optical Chromophores: Fine-Tuning of Arene-Perfluoroarene Interactions for Ultralarge Electro-Optic Activity and Enhanced Thermal Stability", Adv. Mater. 2009, vol. 21, pp. 1976-1981.

Andreu, Raquel et al., "Linear and V-Shaped Nonlinear Optical Chromophores with Multiple 4H-Pyran-4-ylidene Moieties", J. Org. Chem., 2010, vol. 75, pp. 1684-1692.

Ashikari, Yosuke et al., "A Synthetic Approach to Dimetalated Arenes Using Flow Microreactors and the Switchable Application to Chemoselective Cross-Coupling Reactions", J. Am. Chem. Soc., 2020, vol. 142, pp. 17039-17047.

Beaudin, Andrew M. R. et al., "Synthesis and Properties of Zwitterionic Nonlinear Optical Chromophores with Large Hyperpolarizability for Poled Polymer Applications", Chem. Mater., 2006, vol. 18, pp. 1079-1084.

Campo, Jochen et al., "Highly sensitive setup for tunable wavelength hyper-Rayleigh scattering with parallel detection and calibration data for various solvents", Optics Express, Mar. 16, 2009, vol. 17, No. 6, pp. 4587-4604.

Clarke, D.J. et al., "Synthesis and Properties of Zwitterionic Chromophores Containing Substituents for Shape Control", AIP Conference Proceedings, 2009, vol. 1151, vol. 90, pp. 90-93.

Dalton, L. et al., "Polymeric Electro-optic Modulators: From Chromophore Design to Integration with Semiconductor Very Large Scale Integration Electronics and Silica Fiber Optics", Ind. Eng. Chem. Res., 1999, vol. 38, pp. 8-33.

De Coene, Yovan et al., "Advent of Plasmonic Behavior: Dynamically Tracking the Formation of Gold Nanoparticles through Nonlinear Spectroscopy", Chem. Mater. 2020, vol. 32, pp. 7327-7337.

De Coene, Yovan et al., "Fluorescence-Free Spectral Dispersion of the Molecular First Hyperpolarizability of Bacteriorhodopsin", J. Phys. Chem. C 2017, vol. 121, pp. 6909-6915.

He, Guang S. et al., "Twisted π-System Chromophores for All-Optical Switching", J. Am. Chem. Soc. 2011, vol. 133, pp. 6675-6680.

Isreal, D. L. Albert et al., "Conformationally-Induced Geometric Electron Localization. Interrupted Conjugation, Very Large Hyperpolarizabilities, and Sizable Infrared Absorption in Simple Twisted Molecular Chromophores", J. Am. Chem. Soc. 1997, 119, 3155-3156.

Isreal, D. L. Albert et al., "Remarkable NLO Response and Infrared Absorption in Simple "Twisted Molecular d-Chromophores", J. Am. Chem. Soc., 1998, vol. 120, pp. 11174-11181.

Ito, Satoru et al., "Synthesis of Highly Twisted and Fully πConjugated Porphyrinic Oligomers", J. Am. Chem. Soc., 2015, vol. 137, pp. 142-145.

Jia, Jidong et al., "Enhanced Reverse Saturable Absorption in Substituted Twistacenes from Visible to Near-Infrared: Modulation of Terminal Twisted πConjugated Units", This: J. Phys. Chem. C., 2020, vol. 124, pp. 4701-4708.

Kang, Hu et al., "Efficient Synthesis and Structural Characteristics of Zwitterionic Twisted d-Electron System Biaryls", Org. Lett., 2005, vol. 7, No. 17, pp. 3722-3724.

Kang, Hu et al., "Ultralarge Hyperpolarizability Twisted d-Electron System Electro-Optic Chromophores: Synthesis, Solid-State and Solution-Phase Structural Characteristics, Electronic Structures, Linear and Nonlinear Optical Properties, and Computational Studies", J. Am. Chem. Soc. 2007, vol. 129, pp. 3267-3286.

(56) References Cited

PUBLICATIONS

Knag, Hu et al., "Exceptional Molecular Hyperpolarizabilities in Twisted p-Electron System Chromophores", Angew. Chem. Int. Ed. 2005, vol. 44, pp. 7922-7925.

Lou, Alexander J. T. et al., "A Twist on Nonlinear Optics: Understanding the Unique Response of π-Twisted Chromophores", Acc. Chem. Res. 2019, vol. 52, pp. 1428-1438.

Lou, Alexander J. T. et al., "Unprecedented Large Hyperpolarizability of Twisted Chromophores in Polar Media", J. Am. Chem. Soc., 2018, vol. 140, pp. 8746-8755.

Marenich, Aleksandr V. et al., "Universal Solvation Model Based on Solute Electron Density and on a Continuum Model of the Solvent Defined by the Bulk Dielectric Constant and Atomic Surface Tensions", J. Phys. Chem. B., 2009, vol. 113, pp. 6378-6396.

Mikhailov, Ivan A. et al., "Electronic Properties of a New Two-Photon Absorbing Fluorene Derivative: The Role of Hartree-Fock Exchange in the Density Functional Theory Design of Improved Nonlinear Chromophores", J. Phys. Chem. C., 2009, vol. 113, pp. 20719-20724.

Morisaki, Yasuhiro et al., "Synthesis and Photoluminescence Behaviors of Anthracene-Layered Polymers", Journal of Polymer Science, Part A: Polymer Chemistry, 2014, vol. 52, pp. 2815-2821.

Spivey, Alan C. et al., "Conjugate Addition of 2- and 4-Pyridylcuprates: An Expeditious Asymmetric Synthesis of Natural (−)-Evoninic Acid", Organic Letters, 2007, vol. 9, No. 5, pp. 891-994.

Teran, Natasha B. et al., "Twisted Thiophene-Based Chromophores with Enhanced Intramolecular Charge Transfer for Cooperative Amplification of Third-Order Optical Nonlinearity", J. Am. Chem. Soc., 2016, vol. 138, pp. 6975-6984.

Wang, Yiliang et al., "Twisted π-Electron System Electrooptic Chromophores. Structural and Electronic Consequences of Relaxing Twist-Inducing Nonbonded Repulsions", J. Phys. Chem. C., 2008, vol. 112, pp. 8005-8015.

Xiong, Xiaodong et al., "Zwitterionic-Salt-Catalyzed Site-Selective Monobromination of Arenes", Org. Lett., 2017, vol. 19, pp. 4243-4246.

Xu, Huajun et al., "Ultrahigh Electro-Optic Coefficients, High Index of Refraction, and Long-Term Stability from Diels-Alder Cross-Linkable Binary Molecular Glasses", Chem. Mater., 2020, vol. 32, pp. 1408-1421.

Xu, Jinjia et al., "A helically-twisted ladder based on 9,90-bifluorenylidene: synthesis, characterization, and carrier-transport properties", Mater. Chem. Front., 2018, vol. 2, pp. 780-784.

Zhao, Yan et al., "Design of Density Functionals by Combining the Method of Constraint Satisfaction with Parametrization for Thermochemistry, Thermochemical Kinetics, and Noncovalent Interactions", J. Chem. Theory Comput., 2006, vol. 2, pp. 364-382.

Bai, Yaowen et al., "A New Approach to Highly Electrooptically Active Material Using Cross-Linkable, Hyperbranched Chromophore-Containing Oligomers as a Macromolecular Dopant", JACS, 2005, vol. 127, pp. 2060-2061.

Carlotti, Marco et al., "Thermochromic polyethylene films doped with perylene chromophores: experimental evidence and methods for characterization of their phase behaviour", Polym. Chem., 2015, vol. 6, 4003-4012.

Cheng, Yen-Ju et al., "Donor-Acceptor Thiolated Polyenic Chromophores Exhibiting Large Optical Nonlinearity Excellent Photostability", Chem. Mater., 2008, vol. 20, pp. 5047-5054.

Cheng, Ziyoa et al., "Photo-crosslinkable second-order nonlinear optical polymer: facile synthesis and enhanced NLO thermostability", Polym. Chem., 2018, vol. 9, 99. 3522-3527.

Cojocariu et al., "Light-induced motions in azobenzene-containing polymers", Pure Appl. Chem., 2004, vol. 76, Nos. 7-8, pp. 1479-1497.

Multicom, "Copper vs. Fiber Which to Choose", https://www.multicominc.com/product-category/solutions/video-data-voice/fiber-optics/?filtering=1&filter_Manufacturer=multicom, 2022, 4 pages.

Crawford, Kaitlyn E. et al., "Regio- and Stereospecific Cyclopolymerization of Bis(2-propenyl)diorganosilanes and the Two-State Stereoengineering of 3,5-cis,isotactic Poly(3,5-methylene-1-silacyclohexane)s", ACS Macro Lett. 2014, vol. 3, pp. 506-509.

Crawford, Kaitlyn E. et al., "Stereoengeneering of Poly (1, 3-methylenecyclohexane) via Two-State Living Coordination Polymerization of 1, 6-Heptadiene", J. Am. Chem. Soc., 2013, vol. 135, pp. 8778-8781.

Crawford, Kaitlyn E. et al., "De Novo Design of a New Class of "Hard-Soft" Amorphous, Microphase-Seperated, Polyolefin Block Copolymer Thermoplastic Elastomers", ACS Macro Lett., 2015, vol. 4, pp. 921-925.

Dalton, Larry R. et al., "25 Years of Organic Electro-Optics and Future Prospects", Department of Chemistry, University of Washington, 2018, 56 pages.

Dalton, Larry R. et al., "Organic Electro-Optics and Photonics", Molecules, Polymers, and Crystals, 2015, 2 pages.

Dalton, L.R. et al., "Synthesis and Processing of Improved Organic Second-Order Nonlinear Optical Materials for Applications in Photonics", Chem. Mater., 1995, vol. 7, No. 6, pp. 1061-1081.

Dalton, Larry R. et al., "Electric Field Poled Organic Electro-optic Materials: State of the Art and Future Prospects", Chem. Rev., 2010, vol. 110, pp. 25-55.

Dalton, Larry R. et al., "Electrically poled organic materials and thermo-optic materials", www.knovel.com, 2015, 57 pages.

Dhinojwala, Ali et al., "Rotational reorintation dynamics of disperse red 1 in polystyrene: a-relaxation dynamics probed by second harmonic generation and dielectric relaxation", J. Chen. Phys., Apr. 1994, vol. 100, No. 8, pp. 6046-6054.

Dhinojwala, Ali et al., "Retardation of rotational reorientation dynamics in polymers near the glass transition: a novel study over eleven decades in time using second-order non-linear optics", Journal of Non-Crystalline Solids, 1994, vol. 172-174, pp. 286-296.

Dunning, Thom. H. Jr. et al., "Gaussian Basis Sets for Molecular Calculations", Plenum Press, 1977, 28 pages.

Enami, Y. et al., "Hybrid polymer/sol-gel waveguide modulators with exceptionally large electro-optic coefficients", Nature Photonics, Jul. 2007, vol. 1, pp. 180-185.

Espinosa, Lorella L. et al., "Pulling Back The Curtain: Enrollment and Outcomes at Minority Serving Institutions", American Council on Education, 2017, pp. 1-57.

Eustis, Susan, "Optical Modulators Poised for Explosive Market Growth", Market Research Blog, Sep. 24, 2018, 9 pages.

Feng, Hongbo et al., "Block Copolymers: Synthesis, Self-Assembly, and Applications", Polymers, 2017, vol. 9, No. 494, 31 pages.

Feng, Liang-Wen et al., "Readily Accessible Benzo[d]thiazole Polymers for Nonfullerene Solar Cells with >16% Efficiency and Potential Pitfalls", ACS Energy Lett. 2020, 5, 6, 1780-1787.

Fleischmann, Carolin et al. "Polymers and Dyes: Developments and Applications", Polymers, 2015, vol. 7, pp. 717-746.

Frattarelli, David et al., "Self-Assembly from the Gas-Phase: Design and Implementation of Small-Molecule Chromophore Precursors with Large Nonlinear Optical Responses", J. Am. Chem. Soc., 2009, vol. 131, pp. 12595-12612.

Garmire, Elsa, "Nonlinear optics in daily life", Optics Express, Dec. 16, 2013, vol. 21, No. 25, 13 pages.

Hall, David B. et al., "Translation-Rotation Paradox for Diffusion in Glass-Forming Polymers: The Role of the Temperature Dependence of the Relaxation Time Distribution", Physical Review Letters, Jul. 7, 1997, vol. 79, No. 1, pp. 103-106.

He, Yanling et al., "Enhanced electro-optic activity of two novel bichromophores which are synthesized by Cu(I) catalyzed click-reaction", Dyes and Pigments, 2017, vol. 139, pp. 756-763.

Huang, Xiaoqing et al., "Synthesis of Bis(N,N-diethyl) aniline-Based, Nonlinear, Optical Chromophores with Increased Electro-Optic Activity by Optimizing the Thiolated Isophorone Bridge", Symmetry 2022, vol. 14, No. 586, 18 pages.

Jazbinsek, Mojca et al., "Organic Crystals for the THz Photonics", Appl. Sci., 2019, vol. 9, vol. 882, 44 pages.

Jin, Meng et al., "Dendronized Polymers with High FTC-chromophore Loading Density: Large Second-order Nonlinear Optical Effects, Good Temporal and Thermal Stability", Chinese J. Polym. Sci., 2020, vol. 38, pp. 118-125.

(56) References Cited

PUBLICATIONS

Johnson, Lewis E. et al., "Optimizing Calculations of Electronic Excitations and Relative Hyperpolarizabilities of Electrooptic Chromophores", Acc. Chem. Res., 2014, vol. 47, pp. 3258-3265.

Kaatz, Philip et al., "Relaxation Processes in Nonlinear Optical Polyimide Side-Chain Polymers", Macromolecules, 1996, vol. 29, pp. 1666-1678.

Kim, Tae-Dong et al., "Ultralarge and Thermally Stable Electro-Optical Activities from Supramolecular Self-Assenbled Molecular Glasses", J. Am. Chem. Soc., 2007, vol. 129, pp. 488-489.

Kuo, Weng-Jang et al., "Novel Guest-Host NLO poly(ether imide) Based on Two-Dimensional Carbazole Chromophore with Sulfonyl Acceptors", Macromolecules, 2001, vol. 34, pp. 2373-2384.

Latour, Gael et al., "Correlatice nonlinear optical microscopy and infrared nanoscopy reveals collagen degradation in altered parchments", Scientific Reports, 2016, vol. 6, No. 26344, 9 pages.

Lehn, Jean-Marie, Supramolecular Chemistry-Scope and Perspectives Molecules, Supermolecules, and Molecular Devices (Nobel Lecture), Angew. Chem. Int. Ed. Engl., 1988, vol. 27, pp. 89-112.

Li, Zhou et al., "Automatic quantification of filler dispersion in polymer composites", Polymer, 2012, vol. 53, pp. 1571-1580.

Li, Ming et al., "Molecular engineering of organic chromophores and polymers for enhanced bulk second-order optical nonlinearity", J. Mater. Chem. C., 2017, vol. 5, pp. 4111-4122.

Liu, Jialei et al., "Progress in the enhancement of electro-optic coefficients and orientation stability for organic second-order nonlinear optical materials", Dyes and Pigments, 2020, vol. 181, 27 pages.

Liu, J. et al., "Free-vol. Distributations of Polystyrene Probed by Positron Annihilation: Comparison with Free-Volume Theories", Macrolecules, 1993, vol. 26, pp. 7149-7155.

Luo, Jingdong et al., "Phenylteraene-Based Nonlinear Optical Chromophores with Enhanced Chemical Stability ana Elextrooptic Activity", Organic Letters, 2007, vol. 9, No. 22, pp. 4471-4474.

Mari, Meropi et al., "Non-Linear Microscopy: A Well-Established Technique for Biological Applications towards Serving as a Diagnostic Tool for in situ Cultural Heritage Studies", Sustainability, 2020, vol. 12, No. 1409, 19 pages.

Medvedev, A.V. et al., "Phase Behavior and Photooptical Properties of Liquid Crystalline Functionalized Copolymers with Low-Molecular-Mass Dopants Stabilized by Hydrogen Bonds", Macromolecules, 2005, vol. 28, pp. 2223-2229.

Miller, D.A.B., "Limit to the Bit-Rate Capacity of Electrical Interconnects from the Aspect Ratio of the System Architecture", G. L. Report No. 5458, Oct. 1996, 21 pages.

Mohammad-Pour, Gavin S. et al., "Modular Design of Fluorescent Dibenzo- and Naphtho-Fluoranthenes: Structural Rearrangements and Electronic Properties", J. Org. Chem., 2018, pp. 8036-8053.

Mohammad-Pour, Gavin S. et al., "A Solid-Solution Approach for Redox Active Metal-Organic Frameworks with Tunable Redox Conductivity", J. Am. Chem. Soc., 2019, vol. 141, pp. 19978-19982.

Mori, Yuichi et al., "Large Electro-Optic Activity and Enhanced Temporal Stability of Methacrylate-Based Crosslinking Hyperbranched Nonlinear Optical Polymer", Journal of Polymer Science Part A: Polymer Chemistry 2012, vol. 50, pp. 1254-1260.

Park, Dong Hun et al., "Analysis of multiple reflection effects in reflective measurements of electro-optic coefficients of poled polymers in multilayer structures", Optics Express, Sep. 18, 2006, vol. 14, No. 19, 19 pages.

Pereverzev, Yuriy V. et al., "Guest-Host Cooperativity in Organic Materials Greatly Enhances the Nonlinear Optical Response", J. Phys. Chem. C., 2008, vol. 112, pp. 4355-4363.

Pockels, F., Lehrbuch Der Kristalloptik. B. G. Teubner: Berlin, Germany, 1906, 546 pages.

ZWITTERIONIC COMPOUNDS FOR NON-LINEAR OPTICS, SENSORS, AND SPECTROSCOPY

BACKGROUND

The discussion of shortcomings and needs existing in the field prior to the present invention is in no way an admission that such shortcomings and needs were recognized by those skilled in the art prior to the present disclosure.

In 1893, physicist Friedrich Carl Alwin Pockels discovered the modulation of refractive index in non-centrosymmetric materials (i.e., $C_{\infty v}$ point group, asymmetric materials with no inversion symmetry) when exposed to an external electric field; known today as the Pockels effect. Electro-optic polymers (EOPs), also called nonlinear optic polymers, exhibit electro-optic (EO) activity because the EOP polymer-hosts contain asymmetric chromophore-guests that align acentrically in the direction of an external electric field. As a result, the EOPs display nonlinear optic (NLO) properties according to the Pockels effect. Although the most established asymmetric materials are inorganic crystals such as lithium niobate, organic EOPs have the potential to significantly outperform inorganic materials with respect to their processing ease, low cost, and superior EO performance.

The most explored use of NLO materials is in optical modulators such as the Mach-Zehnder interferometer as shown in FIG. 6. The modulator splits an incoming light beam into two separate waveguide arms. The light in one arm passes through the NLO material (such as an EOP) while being modulated by a low-frequency external electric field, which causes a phase shift. When the light rejoins, then the output signal is either amplified or attenuated depending on whether the modulated light is in-phase or out-of-phase with light from the static arm, which enables information coding.

Inducing electro-optic activity in EOPs may be achieved by using a process called thermally-assisted electric poling (poling). First, a thin EOP film (usually 2-4 μm thickness) is encapsulated by two electrodes (by way of non-limiting example, the two electrodes may be indium-tin oxide and gold). An external electric field is applied across the film (usually 40-100 V/μm) while the sample is heated above its glass transition temperature ($T_g$) for a short period. Then the temperature is reduced, well below the $T_g$, and finally the external field is removed, FIG. 7. The polymer in EOPs must be amorphous and have a $T_g$ far above the intended operating temperature (e.g., the standard operating temp. for telecom. is ~80° C., so the preferred $T_g$ is ≥150° C. for those applications). The temperature differential is necessary because the chromophore are 'frozen' in place when the polymer is in its glassy state, but have increased mobility near and above the $T_g$. In the absence of an electric field at/near the $T_g$, acentric, head-to-head alignment of chromophore is lost, resulting in loss, also, of electro-optic activity.

Two primary contributions to EO performance in EOPs are: (i) EO efficiency, and (ii) EO spatiotemporal stability. The former is determined by measuring the $r_{33}$ electro-optic coefficient, and the latter is determined by measuring the $r_{33}$ stability as a function of time. The $r_{33}$ (with units of pm/V) is a macroscopically measurable tensor that corresponds to the macromolecular phase shift that occurs due to the application of an external electric field, Eqn. 1:

$$r_{33} = N\, \beta(\varepsilon,\omega)\, \langle\cos 3\theta\rangle\, g(\varepsilon,n) \qquad \text{Eqn. 1}$$

where N is the chromophore number density, $\beta(\varepsilon,\omega)$ is the molecular first order hyperpolarizability (which is a measure of how easily the chromophore molecule can be polarized), $\langle\cos_3\theta\rangle$ is the acentric order parameter (related to the number of asymmetric chromophore that undergo acentric directional order in the presence of an electric field), and $g(\varepsilon,n)$ is the modified Lorentz-Onsager factor (which is a local-field correction value that relates to the dielectric of the material). A review that derives the $r_{33}$ tensor and confirms its significance in NLO materials is in reference.

Asymmetric chromophores are electron transfer molecules with an electron donating group, an electron accepting group, and a connecting electron transport bridge. The stronger the electron donating and accepting capability of the respective end groups, the greater the hyperpolarizability, $\beta$ of the molecule. In optimal conditions, the $r_{33}$ EO coefficient, scales with $\beta$ according to $r_{33} \sim \mu\beta/Mn$, were $\mu$ is the chromophore's dipole moment (component of the acentric order parameter), and Mn is its molecular weight (component of the number density, which is N=Avogadro's number times the material density, divided by the Mn).

Many conventional chromophores that are considered to have "high" second-order nonlinearity ($\beta$) are low stability compounds that are rather difficult to synthesize. There are many compounds in this class which have increased stability, but it comes at the cost of lower $\beta$. A need, therefore, exists for chromophores that are easier to synthesize and are comprised of highly stable aromatic compounds, increasing the overall commercial viability.

BRIEF DESCRIPTION OF THE FIGURES

Many aspects of this disclosure can be better understood with reference to the following figures.

FIG. 3. a) Normalized visible spectrum of chromophore E1 in various solvents. b-d) UV-Vis molar absorptivity values in various solvents, averaged from 3-5 data sets within the linear range: b) E1 wherein $CH_2Cl_2$ is excluded due to the nonlinear ICT absorbance loss related to concentration; c) E2a in only MeCN, DMF and acetone due to lack of solubility in the remaining solvents; d) E2a.

Figure 1:
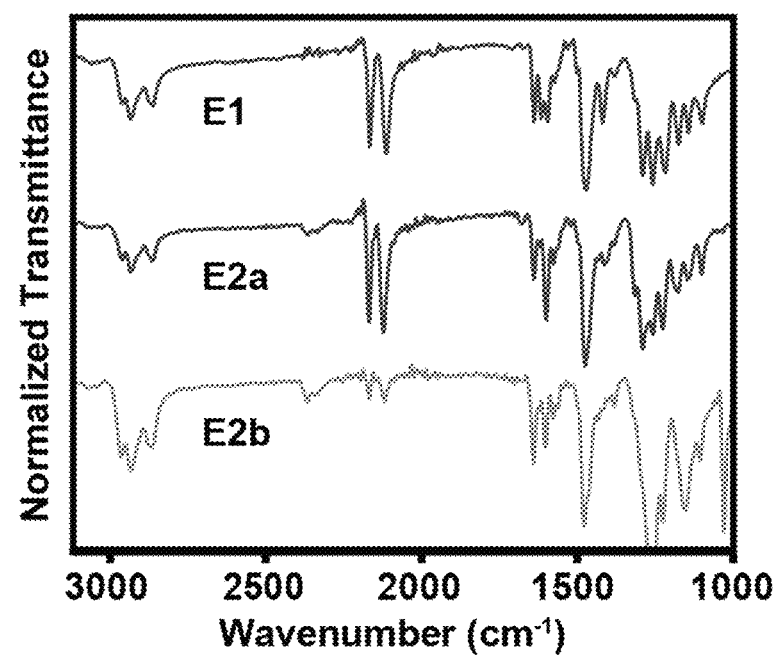
FIG. 1. IR spectra of chromophores E1, E2a, and E2b.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the term "standard temperature and pressure" generally refers to 25° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C.

Unless otherwise specified, all percentages indicating the amount of a component in a composition represent a percent by weight of the component based on the total weight of the composition. The term "mol percent" or "mole percent" generally refers to the percentage that the moles of a particular component are of the total moles that are in a mixture. The sum of the mole fractions for each component in a solution is equal to 1.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As used herein, the term "mixing" refers to a unit operation in industrial process engineering that involves manipulation of a heterogeneous physical system with the intent to make it more homogeneous. Mixing is performed to allow heat and/or mass transfer to occur between one or more streams, components or phases.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

For molecules having isomers or exhibiting one or more chiral centers only one of the possible variations may be shown for the sake of brevity. A person having ordinary skill in the art will appreciate that disclosure of all such variations is intended. When a specific variation is preferred, this disclosure will so state.

Various embodiments are described by reference to chemical structures. In the chemical structures various chemical moieties are represented by R-groups. Some R-groups are described by reference to another chemical structure. A wavy bond line in a structure representing an R-group indicates the point at which the R-group is attached to or bonded to the main structure. In some chemical structures various cyclic moieties are represented by lettered rings. The lettered ring may represent a variety of cyclic structures. Some cyclic structures are described by reference to another chemical structure. A wavy bond line in a structure representing a cyclic structure indicates a bond that is shared with the main structure, or the point at which the cyclic structure is fused to the main structure to form a polycyclic structure. Various subscripts are also used. Each R-group has a numeric subscript which distinguishes it from other R-groups. R-groups and lettered rings may also include a lowercase alphabetical subscript, indicating that different embodiments, may have differing numbers of that moiety. If a lowercase alphabetical subscript may be 0, it means that, in some embodiments, the moiety may not be present. A dashed line in a cyclic structure indicates that in various embodiments one or more double-bounds may be present. When a Compound may include more than one instance of a moiety, for example a moiety represented by an R-group, and that moiety is described as being "independently selected" from a list of options, each instance may be selected from the complete list without respect to any prior selections from the list; in other words, the instances may be the same or different and the same list item may be selected for multiple instances. Some R-group substitutions indicate a range, such as $C_1$-$C_6$ alkyl. Such a range indicates that the R-group may be a $C_1$ alkyl, a $C_2$ alkyl, a $C_3$ alkyl, a $C_4$ alkyl, a $C_5$ alkyl, or a $C_6$ alkyl. In other words, all such ranges are intended to include an explicit reference to each member within the range.

As used herein, "hydrocarbon" refers to an alkane, an alkene, or an alkyne, comprising only carbon and hydrogen atoms.

As used herein, "alkane" refers to a hydrocarbon in which all carbon to carbon bonds are single bonds.

As used herein, "alkene" refers to a hydrocarbon in which at least one carbon to carbon bonds is a double bond.

As used herein, "alkyne" refers to a hydrocarbon in which at least one carbon to carbon bond is a triple bond.

As used herein, "substituted hydrocarbon" refers to a hydrocarbon in which one or more hydrogen atoms have been replaced with one or more functional groups that may include hydrogen, carbon, and other atoms.

As used herein, "alkyl" refers to substituent that is an alkane missing one hydrogen. The term "alkyl" is intentionally unspecific to include many possible substitutions. An alkyl may be cyclic, linear, or branched.

As used herein, the term "perfluoroalkyl" refers to an alkyl in which each carbon atom in the chain is fully saturated with fluorine. The perfluoroalkyl according to various embodiments may be, for example, perfluorophenyl or perfluorobenzyl.

As used herein, "alcohol" refers to a functional group that contains at least one hydroxyl functional group (—OH). An alcohol may be for example, a $C_1$-C12 alkyl alcohol.

As used herein, "thiol" refers to a functional group that is the sulfur analogue of an alcohol, containing at least one (—SH) functional group.

As used herein, "azido" refers to the univalent group $N_3$—, derived from hydrazoic acid.

As used herein, "phenyl" refers to a cyclic group of atoms with the formula $C_6H_5$. Phenyl groups are closely related to benzene and can be viewed as a benzene ring, minus a hydrogen, which may be replaced by some other element or compound to serve as a functional group.

As used herein, "naphthyl" refers to either of two isomeric univalent radicals formally derived from naphthalene by removal of a hydrogen atom.

As used herein, "anthracenyl" to a radical derived from anthracene.

Overview

Organic electro-optic (EO) materials have the potential to greatly improve our ability to generate, process, transmit, detect, switch, and store optical signals in comparison to traditional inorganic EO materials (e.g., $LiNbO_3$). Precise, on-demand manipulation of optical signals is critical for advancing technologies such as imaging, spectroscopy, photovoltaics, telecommunication, and quantum computing. Significant efforts are thus being dedicated to the design and realization of organic EO materials that are stable and programmable with exceedingly large, EO responses.

Push-pull molecules such as asymmetric chromophores have been the focus of extensive study over the past few decades to identify structures capable of achieving large first hyperpolarizability, $\beta$. Recently, π-conjugated zwitterions encompassing twist structures have emerged with unprecedented $\mu\beta$, a scalar product wherein $\beta$ is vectorial hyperpolarizability and $\mu$ is the structure's dipole moment. Within these structures, strong intramolecular charge transfer occurs when transitioning from the ground state to the first excited state, while maintaining a large polarity along the π-conjugated axis—a driving force of traditional planar push-pull molecules. The structure's composition and the extent of its out-of-plane character facilitates twisted intramolecular charge transfer, TICT. By harnessing TICT chromophores, experimental $\mu\beta$ values up to $-488,000\pm48,000\times10^{-48}$ esu by Electric Field-Induced Second Harmonic Generation (EFISH) at 1907 nm in dichloromethane ($CH_2Cl_2$) has so far been reported.[1] A caveat with EFISH is that $\mu$ and $\beta$ cannot be measured independently leaving some ambiguity in their precise, individual values. For $\mu\beta$ comparison using the same experimental conditions for common planar chromophores, disperse red 1 (DR1) is $480\times10^{-48}$ esu;[2,3] and $\mu\beta$ of FTC-1 is $17,600\times10^{-48}$ esu, Chart 1. In the latter case, $\beta$ was also measured independently to be $635\times10^{-30}$ esu by Hyper Rayleigh Scattering (HRS).[4] When the FTC-1's $\beta$ from HRS is paired with its computed $\mu$, then the combined $\mu\beta$ is $8,550\times10^{-48}$ esu. In considering respective planar and crosslinked chromophores, JRD1 and HLD1, their $\beta$ from HRS at 1300 nm are $3,300\pm50\times10^{-30}$ esu and $2,120\pm50\times10^{-30}$ esu.[5] Although the examples provide a relative comparison, caution is to be exercised because reported values are often collected under different experimental conditions as is the case here (e.g., measurement wavelength and solvent choice).

Chart 1. Chromophore structures.

(ref. 6,7)

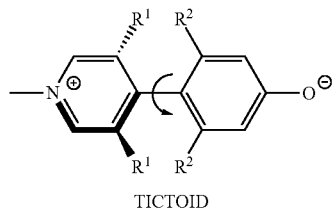

TICTOID (ref. 8)

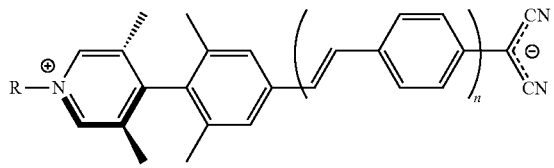

TMC-2, n = 0; TMC-3, n = 1

-continued

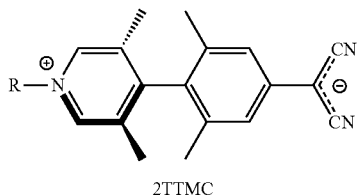
2TTMC
(ref. 1,3)

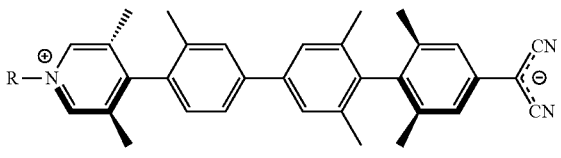
4TTMC
(ref. 1,3)

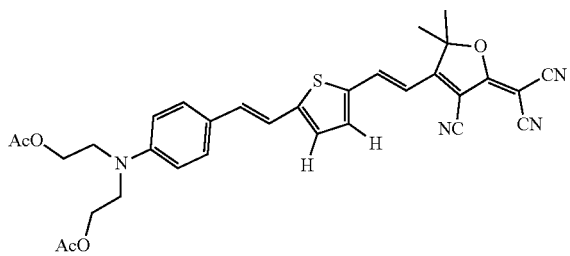
FTC-1
(ref. 4)

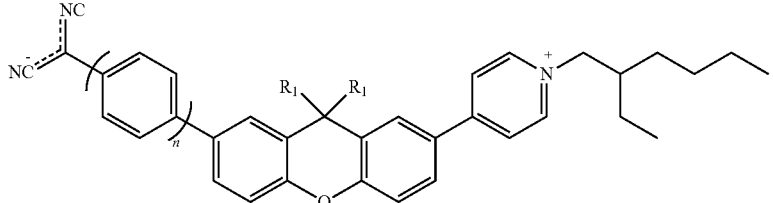

E1: n = 0; $R_1$ = Butyl
E2a: n = 1; $R_1$ = Butyl
E2b: n = 1; $R_1$ = Et. Hex.

R = 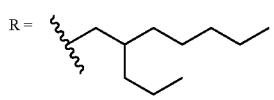

$R_1$ = 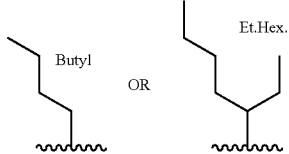

Despite large µβ reported by EFISH, twisted π-conjugated zwitterions tend to exhibit lower than expected EO response in EO polymer composites, measured as the EO coefficient $r_{33}$, because of their propensity to dimerize, forming head-to-tail aggregates. Their synthesis can also be laborious. However, there remains much to discover in developing zwitterionic TICT chromophores as they are a relatively new class of push-pull structures.[1] The first theoretical prediction that TICT chromophores could potentially exhibit unprecedented hyperpolarizabilities was published in 1997 and based on tetraalkyl-substituted 4-quinopyran, abbreviated TICTOID, Chart 1. There, an interplanar dihedral angle was 104° and µβ was ~70,000×10$^{-48}$ esu at an excitation energy of 0.10 eV.[6,7] In comparison, the unsubstituted, planar counterpart yielded theoretical µβ of 27.9×10$^{-48}$ esu.[7] The first experimental example followed in 2005 based on two zwitterionic compounds with tetra-ortho-alkylbiaryl cores, a dicyanomethanide electron donor, and a pyridinium electron acceptor, abbreviated as TMC-2 and TMC-3. The composites feature µβ values up to −488,000×10$^{-48}$±48,000×10$^{-48}$ esu, characterized by EFISH (Chart 1).[8] In this example, the Teng Man method was additionally used to demonstrate experimental $r_{33}$ EO coefficients at 1310 nm with 10% TMC-2 and 5% TMC-3 in poly(vinyl phenol) as an electro optic polymer (EOP) composite. This resulted in 48 pm/V and 320 pm/V only while poling, respectively (compare with ~31 pm/V for inorganic counterpart, LiNbO$_3$). Use of poly (vinyl phenol) was used instead of less polar polymer hosts (such as traditional polycarbonate or polymethyl methacrylate) because of the significantly attenuated $r_{33}$, likely stemming from aggregation. Further, typical concentrations for freely mixed chromophores in an EO polymer matrix range from 20% to 30%.[9] However, doping levels for π-conjugated zwitterionic chromophores can be limited due to strong intermolecular interactions[10] and likely explains the use of lower concentrations. Since the first TICT experimental debut, several reports of π-conjugated zwitterionic TICT chromophores have emerged.[11-19] Although they were generally tedious to synthesize, these chromophores hold the theoretical µβ record of 820,000×10$^{-48}$ esu, according to INDO/SCI calculations for 4TTMC, a TMC derivative with 4 aryl linkages. 4TTMC features three twist angle locations ranging from 40.3° to 88.42°, Chart 1.[1,3] Experimental characterization of µβ was not possible and the $r_{33}$ was not reported. Instead, 2TTMC, a TMC derivative with 2 aryl linkages and a twist angle of 67°, exhibits µβ of −6,000×10$^{-48}$ esu measured by EFISH in CH$_2$Cl$_2$ at 1907 nm, as compared to 12,000×10$^{-48}$ esu computed using INDO/SCI.[1]

Collectively, these and similar foundational studies[11-19] demonstrate that π-conjugated zwitterionic TICT chromophores have potential to significantly increase experimental μβ, which could eventually translate to exceptionally large EO coefficients. However, there is a need to develop π-conjugated zwitterionic TICT chromophores with sites available for modular side-group functionalization to mitigate aggregation and achieve high product yields.

General Description of Embodiments

Various embodiments relate to chromophores that are easier to synthesize compared to prior art chromophores and that are comprised of highly stable aromatic compounds, increasing the overall commercial viability.

The asymmetric chromophores according to various embodiments exhibit nonlinear optical responses in the presence of an external electric field. Embedding asymmetric chromophores in an organic matrix, either by covalent or secondary bonding modes, followed by poling, find use in applications that require modulation of light in the presence of an external stimuli such as an electric field. According to various embodiments, specific design features may enhance electro-optic performance of asymmetric chromophores, namely the degree of hyperpolarizability and their spatiotemporal stability. For long-term and commercial use, it may be necessary to include design features to optimize electro-optic performance while also enabling thermal and chemical stability toward its environment. Common uses of asymmetric chromophores include optical modulators, sensors, terahertz wave generation, and terahertz wave detection etc. Various embodiments provide asymmetric chromophores for use in nonlinear optical systems.

Methods of preparation according to various embodiments is more customizable than currently used synthetic methods allowing for tuning of the physical properties of these materials when embedded in a device. Many materials have high β values when analyzed as a single molecular unit, but when they come into close contact with one another they can form aggregates which attenuates the desired effect of the material. By providing greater control over the physical manifestations of each molecular unit, various embodiments make it possible to reduce aggregation thereby increasing the bulk second-order non-linearity.

Various embodiments may be useful as components in optical modulators, sensors, imaging, spectroscopy, antimicrobial applications, surfactants, ion exchange membranes, electro active materials and devices, mechanical stress indicator, water absorption or humidity related applications, and coatings. Various embodiments may be useful as components in optical modulators, such as the Mach-Zehnder interferometer.

Various embodiments relates to zwitterionic compounds that feature a bridge unit between an electron donor and an electron acceptor. The electron acceptor may be, for example, an alkylated pyridinium acceptor. The electron donor may be, for example, an phenyl malononitrile anion donor. The bridge may be, for example, a xanthene bridge or a thioxanthene bridge. According to the predictions performed via the computational methods wB97x and ZINDO/S, these xanthene or thioxanthene compounds feature second-order non-linearity, that vastly exceed that of conventional NLO chromophores as well as other high 3 value zwitterionic compounds. The xanthene or thioxanthene bridge and overall synthetic path offers the additional benefit of multiple points of synthetic customization, allowing for the incorporation of isolation groups as well as covalent tethering to a host polymer (such as polymethylmethacrylate derivatives), two facets of conventional NLO chromophore design which have resulted in the greatest increases to macroscopic second order non-linearity ($r_{33}$). Various embodiments provide a general xanthene or thioxanthene chromophore, where the R's correspond to any number of compatible organic or inorganic moieties at various available sites for functionalization. The intent is that these chromophores are embedded into a bulk polymer (such as polymethylmethacrylate, polycarbonate, and polyvinylphenol, inter alia), either as a guest-host arrangement or as pendants via covalent bonds, for the purposes of developing organic nonlinear optic materials.

Various embodiments relate to a zwitterionic compound that may include a bridge moiety, an electron accepter moiety, and an electron donor moiety. The bridge moiety may be covalently bonded to both the electron accepter moiety and to the electron donor moiety. The bridge moiety may include one selected from xanthene and thioxanthene. The accepter moiety may include a pyridinium moiety. According to various embodiments, the pyridinium moiety may be an alkylated pyridinium moiety. The donor moiety may include a malononitrile moiety. The malononitrile moiety may be a phenyl malononitrile moiety. According to various embodiments, the zwitterionic compound may exhibit second-order non-linearity.

The zwitterionic compounds may have a propensity to aggregate due to the alternating positive and negative charges on the terminal ends of the compound. Such aggregation may interfere with the electro-optic efficiency. Since each molecule is ideally pointed in a uniform direction rather than alternating. The zwitterionic compound may further comprise an isolation group. As used herein, "isolation groups" are chemical moieties that increase the distance between chromophores thereby decreasing their likelihood to aggregate. Often, they do not contribute to the electronic property of the individual molecule but use their physical bulk to increase the electro-optic quality of the bulk device by separating them from one another or by inducing intermolecular interactions that are favorable towards bulk acentricity. Any of the R groups described herein may be considered "isolation groups" according to various embodiments whether they contribute to the electronics of the molecule or not. According to various embodiments any moiety that may affect the intermolecular interactions between chromophores could be considered an isolation group.

Various embodiments relate to an electro-optic polymer comprising the zwitterionic compound according to any of the other embodiments embedded in a host polymer. The host polymers may be, for example, an amorphous polymer. According to certain embodiments, the amorphous polymer may have a glass transition temperature of more than 80 degrees Celsius and less than 200 degrees Celsius. Other temperature ranges for Tg may also be used. Some examples of host polymers include amorphous polycarbonate, amorphous polymethyl methacrylate and their derivatives, poly(N-vinylpyrrolidone), poly(ethersulfone), and poly(vinylphenol).

According to various embodiments, the zwitterionic compound may be embedded in the host polymer in a pendant arrangement via a plurality of covalent bonds between the host polymer and a plurality of moieties on the compound. In other words, the zwitterionic compound may be covalently bonded to the polymer backbone such that the zwitterionic compound is a "pendant group". The term pendant group (rather than pendant arrangement) is a common term in the polymer community. For example, according to various embodiments, the zwitterionic compound may be embedded in the host polymer in a guest-host arrangement. The common definition of a "guest-host arrangement" is a non-covalently bonded mixture of the chromophore and polymer commonly referred to as a composite. According to various embodiments, the plurality of moieties may be ether, ester, thioether, thioester, amine, amide, triazole, and tetrazole.

and ion-ion (100-350 kJ/mol). The ionic interactions of zwitterions can cause aggregation in head-to-tail orientation (end-on or side-on), the effects of which will be tuned using molecular engineering. By design, there are several sites to functionalize the chromophore for modification of its nuclear and electronic components, and size. The structure was designed to be non-planar because (i) the twisted dihedral angles reduce orbital overlap between the chromophore parts, enhancing β; and (ii) the dihedral angle is

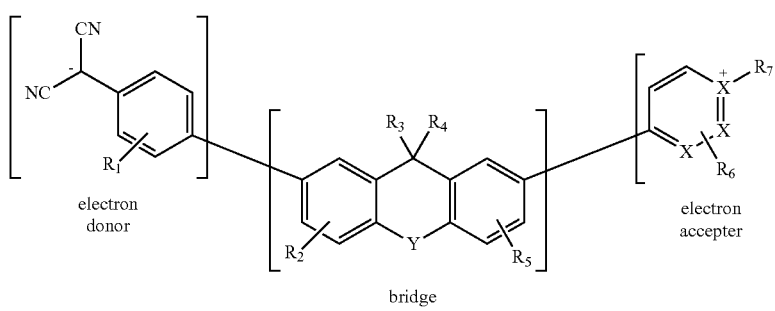

(Structure A)

Structure A shows a generalized zwitterionic xanthene or thioxanthene chromophore with R groups signifying positions from which isolation groups can attached and exchanged.

Various embodiments relate to a compound having a structure according to Structure A, in which X may be C or N, Y may be O or S. If present, $R_1$ may be $C_1$-$C_{12}$ alkyl or $C_1$-$C_{12}$ alkoxy. According to various embodiments $R_1$ may be $C_1$-$C_{12}$ di-alkyl, or $C_1$-$C_{12}$ di-alkoxy. If present, $R_2$ may be benzo, $C_1$-$C_{12}$ alkyl, or $C_1$-$C_{12}$ alkoxy. If present, $R_3$ may be a cyclic, linear, or branched $C_1$-$C_{12}$ substituted hydrocarbon having at least one functional group selected from a perfluoroalkyl, an alcohol, a thiol, an azido, an alkene, an alkyne, a phenyl, a naphthyl, and an anthracenyl. If present, $R_4$ may be a cyclic, linear, or branched $C_1$-$C_{12}$ substituted hydrocarbon having at least one functional group selected from a perfluoroalkyl, an alcohol, a thiol, an azido, an alkene, an alkyne, a phenyl, a naphthyl, and an anthracenyl. $R_3$ and $R_4$ may be the same or different and may be independently selected. According to various embodiments, for example, $R_3$ or $R_4$ may be independently selected from of cyclic, linear, or branched $C_1$-$C_{12}$ alkyl, benzyl, (1-12)-phenyl $C_1$-$C_{12}$ alkyl, perfluorophenyl, perfluorobenzyl, perfluorophenyl methyl, 9-anthracenyl methyl, perfluoro $C_1$-$C_{12}$ alkyl, (1-12) perfluoro $C_1$-$C_{12}$ alkyl methyl, $C_1$-$C_{12}$ alkyl alcohol, $C_1$-$C_{12}$ alkyl thiol, $C_1$-$C_{12}$ alkyl azido, and $C_1$-$C_{12}$ alkynyl. If present, $R_5$ may be benzo, $C_1$-$C_{12}$ alkyl, $C_1$-$C_{12}$ alkoxy, or $C_1$-$C_{12}$ thioalkoxy. If present, $R_6$ may be benzo, or linear, or branched $C_1$-$C_{12}$ alkyl, fluorinated $C_1$-$C_{12}$ alkyl, perfluorophenyl, or 9-anthracenyl methyl. If present, $R_7$ may be linear, or branched $C_1$-$C_{12}$ alkyl, fluorinated $C_1$-$C_{12}$ alkyl, perfluorophenyl, or 9-anthracenyl methyl.

Structure A was identified using a design-computation-experiment feedback loop approach. Structure A has a malononitrile electron donor, a pyridinium electron acceptor, and a bridge. The bridge may be a xanthene bridge or a thioxanthene bridge. A zwitterion was selected for investigation because some exhibit unique supramolecular chemistry and large β. In addition to π-π and dipole-dipole interactions, zwitterions can form ionic interactions such as ion-dipole (50-200 kJ/mol), cation/anion-π (5-80 kJ/mol), tunable with addition of isolation groups. The xanthene or thioxanthene bridge was selected because of its chemical stability compared to its linear conjugated alkene counterpart. These structures were used as a model to initially study the supramolecular chemistry and its correlation with electro-optic performance. New asymmetric chromophores were identified and synthesized. The structural and physical properties of these asymmetric chromophores were also analyzed.

Molecular structures have been confirmed using readily available tools such as Nuclear Magnetic Resonance (NMR) and High-Performance Liquid Chromatography (HPLC) tandem Mass spectrometry. Feasibility of various chromophores has been evaluated for use in an EOP by evaluating the chromophore materials properties: primarily thermal, optical, and chemical stability. These measures provide information about chromophore intermolecular interactions in the solid state, including aggregation.

First and second order thermal phase transitions (melting, crystallization, and glass transition temperatures), and crystallization kinetics may also be analyzed using Differential scanning calorimetry (DSC). The material's μ may be determined using a dipole meter, and, if applicable, the crystal structure may be evaluated using X-ray Diffraction. The chemical stability may be investigated by evaluating thermal degradation, photodegradation, and stability in air and high moisture environments using tools such as Thermogravimetric Analysis (TGA), NMR, HPLC-MS, and Thin-layer Chromatography (TLC). The chromophore optical properties may also be determined. The optical transmittance will dictate the wavelengths of light that are best suited to measure maximum $r_{33}$. The potential for optical loss due to light scattering may be estimated by measuring the refractive index. Chromophore aggregation in solution may be estimated by measuring shifts in spectral band positions as a function of solvent and temperature. The properties may be evaluated using tools readily available such as Ultraviolet-Visible (UV-Vis) Spectrophotometry, Fourier-Transform Infrared Spectroscopy (FTIR), and Ellipsometry.

Provided below are examples relating to studies that use a combination of computation and experiment to identify a class of π-conjugated, zwitterionic TICT chromophores with large pp. It is demonstrated that these chromophores are capable of modular side-group functionalization through straightforward synthetic techniques. The studies demonstrate synthetic feasibility of the new chromophores and their side group interchangeability; compare their calculated vs experimental μβ; then evaluate and discuss their structural, chemical, and optical properties. DFT is used to calculate μ and β of the new chromophores. Spectroscopy techniques, NMR, ATR-FTIR and LC-MS, confirm the intermediate and final product structures. DSC and TGA provide information on their thermal properties. HRS, UV-vis, cyclic voltammetry, and the Teng Man method enable visualization of their optical and electronic properties. The results demonstrate exceptional experimental HRS β values as high as 1,650±150×10-30 esu at 900 nm in MeCN. This β value corresponds to μβ of 86,000×10-48 esu when combined with calculated μ, and μβ figure of merit (FOM) of 121×10-48 esu, where Mw is the molecular weight of the chromophore. The following includes a discussion on the similarity and differences of the structures and experimental parameters leading to the μβ values.

EXAMPLES

Introduction

The following examples are put forth to provide those of ordinary skill in the art with a complete disclosure and description of how to perform the methods, how to make, and how to use the compositions and Compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments.

Materials and Methods

Reagents. All starting materials and solvents were obtained from commercial sources (Aldrich, Fisher, VWR) and were used without further purification unless otherwise specified. 1-Iodopyridine[20], tetramethyl-2-[4-(trimethylsilyl)phenyl]-1,3,2-dioxaborolane[21], 9,9-dibutyl-9H-xanthene[22], and 2-ethylhexyl triflate[1] were synthesized according to literature procedures. Tetrahydrofuran (THF), N,N-dimethylformamide (DMF), MeCN and $CH_2Cl_2$ were purified using a solvent purification system (Innovative Technology) with custom-built alumina columns. 1,2-dichloroethane (DCE), chlorobenzene (PhCl) and chloroform ($CHCl_3$) were dried using 4 Å molecular sieves.

Spectroscopic Analysis. Nuclear Magnetic Resonance (NMR): $^1H$, $^{13}C$, $^{19}F$, and HMBC NMR spectra were collected using a Bruker AVANCE-III 400 MHz spectrometer. $^1H$ and $^{13}C$ chemical shifts are referenced from tetramethylsilane (TMS) at 0 ppm and assigned using residual solvent signals. $^{19}F$ chemical shifts are referenced from $C_6F_6$ as an internal standard. Infrared Attenuated Total Reflectance spectroscopy (FTIR-ATR): Infrared spectra were collected on a JASCO 6600. Liquid Chromatography-Mass Spectrometry (LC-MS): High resolution mass spectra were recorded using an Agilent 6230 TOF coupled with an Agilent Zorbax SB-C18 analytical column. Ultraviolet-Visible Absorbance Spectroscopy (UV-vis): Absorbance measurements were carried under ambient conditions on a Horiba Duetta with wavelengths between 300-800 nm. Molar absorptivity for chromophores E1 and E2a-b were obtained using a 3 to 5-point calibration curve within the limit of linear detection for the reported wavelength. For chromophore-solvent combinations where the spectrum shifts with concentration, the 3 highest concentrations were used as these resulted in the least deviation between samples. Chromophore E1 and E2b were analyzed across 8 solvents, each dried prior to use: MeCN, DMF, acetone, $CHCl_3$, THF, PhCl, $CH_2Cl_2$, and DCE. Chromophore E2a was analyzed across 3 solvents due to limited solubility, each dried prior to use: MeCN, DMF, and acetone.

Thermal and Stability Analysis. Thermogravimetric Analysis (TGA) was conducted using a Shimadzu TGA-50 with temperature range between 25° C. and 800° C. Differential Scanning calorimetry (DSC) was conducted using a Netzsch Polyma 300 with 20° C./min heating and cooling rates. Samples were prepared by hermetically sealing ~8 mg of product in aluminum pans. Curves of the second heat and first cool are reported. Melting temperature of neat chromophores were determined using a Melt-Temp brand Electrothermal 1101 D melting point apparatus measured by a Fluke II Digital Thermometer. Air and moisture stability were evaluated by collecting $^1H$ NMR spectra of ~2 mg of chromophore dissolved in DMSO-$d_6$ under ambient conditions (room temperature and 55% humidity) at 1 h, 24 h, and 72 h.

Electrochemical Analysis. Cyclic voltammetry (CV) was performed in an Ar-filled glovebox with a 730C SI Instruments biopotentiostat-galvanostat at a 100 mV/s scan rate. Analyte solutions were prepared at a 1.0 mM chromophore concentration in 0.1 M (tetrabutylammonium)$PF_6$/MeCN electrolyte with a 2 mm Pt-disc working electrode, Pt counter electrode, and Pt reference electrode. Potential was referenced against ferrocene ($FeCp_2^+/FeCp_2$) at 0 V as an internal standard.

Poling and Electro Optic Coefficient ($r_{33}$). The electro-optic coefficient was measured by Nonlinear Materials Corp. using the ellipsometric technique under ambient conditions. All samples were prepared in cleanroom and inert atmosphere environments prior to poling and $r_{33}$ measurement according to the following procedures: 10 wt % E1 and 5 wt % E2a, each with 15 wt % amorphous poly(vinyl phenol) in DMF was spun on ITO-glass slides with a sequential spin recipe of 500 rpm for 5 s, 850 rpm for 30 s and 1200 rpm for 30 s, each with 500 rpm/s acceleration. Film thickness was characterized by an NT-2000 model profilometer (WYKO Corp.). Refractive index and extinction coefficients optical constants (n and k) were measured by variable angle spectroscopic ellipsometry (VASE) analysis of chromophore thin films on glass substrates using a J. A. Woollam M-2000 instrument. The films were coated with 60 nm thickness Au as top electrode via electron beam evaporation. Samples were poled under nitrogen at 25 V/μm and 110° C.×5 min.

Hyper Rayleigh Scattering (HRS). Measurements were performed with a 900 nm fundamental wavelength from a mode-locked femtosecond laser source (~1 Wave, 80 MHz, Spectra-Physics, Insight DS+) with a spectrally resolved detection (90°, Bruker IS/SM 500 spectrometer, Andor Solis iXon Ultra 897 EMCCD camera). The spectrally resolved total signal (including the narrow HRS peak and any broad multiphoton fluorescence bands) were fitted to a sum of Gaussian bands. MeCN (anhydrous, 99.8%, Aldrich) was assigned a static $β_{0,zzz}$ value of $0.578×10^{-30}$ esu based on work by Campo et al.[23] Details of the experimental set-up and data analysis are published.[24]

Computations. All quantum chemical calculations were performed using Gaussian 16 suite of programs[25] at the Density Functional Theory (DFT) level in conjunction with D95+* basis set.[26] Molecular geometry optimization and hyperpolarizability predictions were performed using M06-2X exchange-correlation functional. According to a recent report,[27] M06-2X functional provided superior predictions of relative $\beta_{HRS}$ values but poorer predictions of $\lambda_{max}$. Therefore, the absorption spectra were predicted by finding 24 excited states combined with Time-Dependent DFT (TDDFT) approach, where the solvent effects were accounted for by using the dielectric continuum model in the solvent model density (SMD) parameterization,[28] as implemented in Gaussian 16. The M05-QX exchange-correlation functional was derived[29] by interpolation between M05 and M05-2X functionals.[30] M05-QX includes 35% of the exact exchange and was shown to closely predict the energies not only for the lowest, but for the higher-laying excited electronic states as well. In addition, the electronic states with substantial charge transfer character are described more accurately by M05-QX than by commonly used functionals, such as B3LYP.

Synthesis. E1 and E2a-b are easy to synthesize using standard organic chemistry transformations. To achieve moderate-to-high yields for compounds 1-8, E1, and E2a-b we recommend the following as guidelines: (1) Conduct all steps using air-free Schlenk techniques because the pyridine group on 4-8 is prone to oxidation. (2) Freshly sublime the 4-iodopyridine for 4 immediately prior to use because dark colored impurities form easily that do not show in NMR but nevertheless poisons the Pd(PPh3)4 catalyst. (3) Minimize contact time of the crude compounds with silica during column chromatography because the pyridine is basic and can irreversibly interact with the acidic silica. (4) During purification with column chromatography, load the crude mixture using a solution of CH2Cl2 and hexanes (50:50). We developed these practices while troubleshooting initial difficulties with yield and stability.

Complete synthetic steps are detailed in the further examples below. Briefly, chromophore E1 was synthesized in 7 steps (see Scheme 1) wherein individual products are referred to here as compounds 1-6, with the 7 final compound being E1. Compound 1: deprotonation of xanthene at the 9-position in dimethylsulfoxide and sodium hydride followed by addition (via nucleophilic attack) of 2 eq. iodobutane electrophile (77% yield). Compounds 2-3: asymmetric substitution; aromatic bromination of 1 with N-bromosuccinimide (NBS) in MeCN to synthesize compound 2 as an inseparable mixture with dibrominated and starting material (structure shown in SI) followed by borylation (70% yield overall for both steps). Compound 4: Suzuki coupling of 3 with 4-iodopryidine (87% yield). Compound 5: aromatic bromination of 4 with NBS in MeCN (75% yield). Compound 6: coupling of aryl bromide on 5 with sodium dicyanomethanide using tetrakis(triphenylphosphine)palladium(0) (Pd(PPh3)4) (65% yield). Chromophore E1: two-step, one-pot addition of 2-ethylhexyl triflate at room temperature in CH2Cl2, followed by deprotonation of the dicyanomethine with excess sodium ethoxide (73% yield).

Scheme 1.

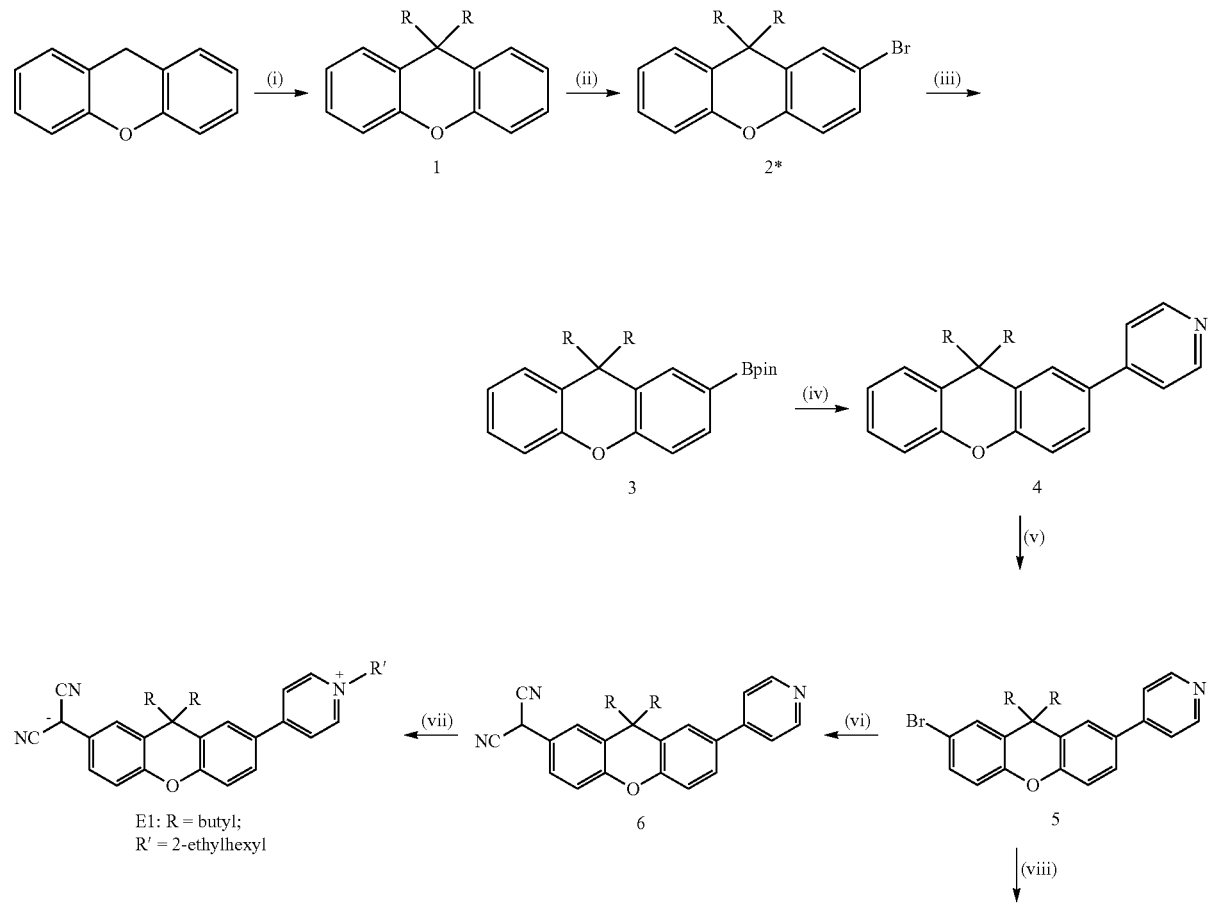

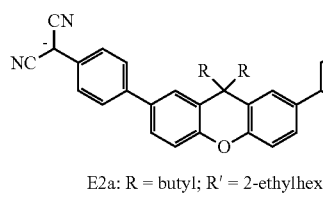
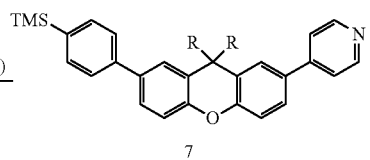

E2a: R = butyl; R' = 2-ethylhexyl
E2b: R = R' = 2-ethylhexyl (i) NaH, DMSO, 1-iodobutane, RT.
(ii) NBS, MeCN, 60° C.; *mixture of products.
(iii) n-BuLi, THF, iPrBpin, -78° C.
(iv) 4-iodopyridine, Pd(PPh$_3$)$_4$, K$_2$CO$_3$, DME:EtOH (3:1), 80° C.
(v) NBS, MeCN, 80° C.
(vi) malononitrile, Pd(PPh$_3$)$_4$, NaH, THF, 100° C.
(vii) 2-ethylhexyl triflate, CH$_2$Cl$_2$, NaOEt, EtOH.
(viii) 4-TMS-phenyl bpin, Pd(PPh$_3$)$_4$, K$_2$CO$_3$, DME:EtOH (3:1), 100° C.
(ix) ICl, CH$_2$Cl$_2$, 25° C.
(x) malononitrile, Pd(PPh$_3$)$_4$, NaH, THF, 100° C.
(xi) 2-ethylhexyl triflate, CH$_2$Cl$_2$, NaOEt, EtOH.

Chromophores E2a-b were synthesized in 9 steps wherein individual products are referred to here as compounds 1-5 and 7-8 with the final compound being E2. Compounds 1 through 5 are the same as for E1, Scheme 1. Compound 7: coupling of 5 with phenyl pinacol borate wherein the 4-position is protected with trimethyl silyl (TMS) (89% yield). Compound 8: iodo substitution of TMS through iodination with ICl in CH$_2$Cl$_2$ under mild conditions (79% yield). Compound E2: coupling of aryl iodide on 8 with sodium dicyanomethanide using Pd(PPh$_3$)$_4$ (similar to 6 for E1; 59% yield). Chromophore E2a two-step, one-pot addition of 2-ethylhexyl triflate at room temperature in CH$_2$Cl$_2$, followed by deprotonation of the dicyanomethine with excess sodium ethoxide, analogous to 6 (73% yield). E2b follows the same synthetic steps resulting in similar product yields; the primary difference being the selection of alkyl substituent, 2-ethylhexyl vs butyl at the 9-position on xanthene, Scheme 1.

Molecular Structure. NMR, IR, and LC-MS characterization confirm the molecular structures for each compound, including the resulting chromophores E1 and E2a-b (see Figures S1-22 for 1H and 13C NMR of intermediate compounds). Figures S17, S19 and S21 provide 1H NMR spectra for E1 and E2a-b, respectively. Figure S17 shows eight unique aromatic signals representing a total integration of 10 protons as expected for E1, and Figure S19 shows 10 unique aromatic signals representing 14 protons as expected for E2a. There are downfield aromatic resonances at 8.99 ppm and 8.58 ppm for E1, 9.02 ppm and 8.61 ppm for E2a. There are mid-range aromatic resonances at 6.62, 6.71, 6.82, 7.19, 8.01, and 8.24 ppm for E1, 7.08, 7.29, 7.46, 7.64, 8.05, and 8.30 ppm for E2a. Figure S19 has two additional upfield resonances at 7.39 ppm and 6.81 ppm for E2a representing the phenyl ring near the dicyanomethanide donor region. The incorporation of three racemic 2-ethylhexyl groups, as found in E2b, causes a complex array of signals in the aromatic region because it is a diastereomeric mixture. Regardless, the total integration values of the aromatic region correspond to a total of 14 protons, with the combined pyridinium aromatic signals at 8.62 and 9.04 ppm, manifesting as signals that are discrete enough to act as the integration point of reference for the remaining molecular signals. The aliphatic regions for both E1 and E2a are nearly identical and represent the overlapping signals of the two central butyl groups and the 2-ethylhexyl chain on the pyridinium with an expected combined integration of 35 protons. The aliphatic region for E2b has greater signal overlap accounting for the two central 2-ethylhexyl group and the third 2-ethylhexyl chain on the pyridinium with an expected combined integration of ca. 51 protons. 13C NMR spectra in Figures S18 and S20 depict the appropriate number of signals expected for both compounds. E2b, however, is a diastereomeric mixture resulting from the 3 chiral centers, which yields too many peaks for accurate determination. The chemical structure for E1 a is further articulated by HMBC NMR, which confirms the donor-acceptor substitution pattern relative to the 2 and 7 positions on the xanthene, Figure S23. Each chromophore, as synthesized, contains a counterion for the pyridinium functional group in the form of a triflate, which is verified via 19F NMR showing a chemical shift of −80.1 ppm for each of the chromophores, Figures S24-26.

Example 1 Synthesis of Compound I

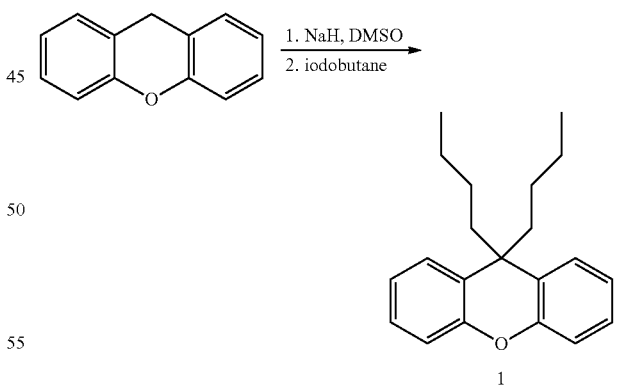

9,9-dibutylxanthene (1)[1]: Sodium hydride (18.5 g, 60 wt % disp, 465 mmol) was loaded into an oven-dried 1 L Schlenk flask equipped with a magnetic stir bar under anhydrous conditions. Dimethylsulfoxide (300 mL) was injected via syringe and the suspension was heated to 60° C., resulting in the evolution of hydrogen gas. The flask was heated in this manner for 2 h, resulting in a light brown solution. Separately, xanthene (10.0 g, 54.9 mmol) was added to a 250 mL Schlenk flask equipped with a magnetic stir bar, similarly under anhydrous conditions. The solid was dissolved in anhydrous dimethylsulfoxide (150 mL) (Note: this usually requires the application of mild heating) and the resulting solution was added dropwise to the flask sodium hydride at 0° C., causing the reaction mixture to turn a deep red. The solution was allowed to warm to RT for 2 h before again being cooled to 0° C. 1-Bromobutane (23.7 mL, 220 mmol) was then added dropwise over the course of 30 minutes (Note: this process is extremely exothermic, caution should be exercised) causing the solution to turn a pale red before being allowed to warm to RT for 12 h. The reaction was monitored by TLC until the starting material was no longer observed. The reaction products were then poured over ice-water (250 mL) and extracted with hexanes (3×150 mL). The combined organic phase was rinsed with cold water (3×100 mL), brine (100 mL), dried over sodium sulfate, and filtered before the solvent was removed under reduced pressure. The resulting crude material was purified via column chromatography (SiO$_2$, Hexanes) yielding compound 1 (12.5 g, 77%) as a colorless oil that crystallizes upon standing. $^1$H NMR (400 MHz, CDCl$_3$, 25° C.) δ7.29 (dd, J=7.8, 1.6 Hz, 2H), 7.22-7.15 (m, 2H), 7.06 (td, J=7.6, 1.4 Hz, 2H), 7.00 (dd, J=8.1, 1.3 Hz, 2H), 2.00-1.87 (m, 4H), 1.11 (p, J=7.2 Hz, 4H), 0.84 (dtd, J=12.0, 9.2, 8.7, 5.6 Hz, 4H), 0.70 (t, J=7.3 Hz, 6H). $^{13}$C NMR (100 MHz, CDCl$_3$, 25° C.) δ151.88 (2C), 127.28 (2C), 126.37 (2C), 125.78 (2C), 123.11 (2C), 116.11 (2C), 45.31 (2C), 42.23, 27.13 (2C), 23.14 (2C), 14.00 (2C). HRMS (ESI-TOF) m/z: [M]+ Calculated for C211-1260 294.1978; Found 294.1940.

Example 2: Synthesis of Compound 2

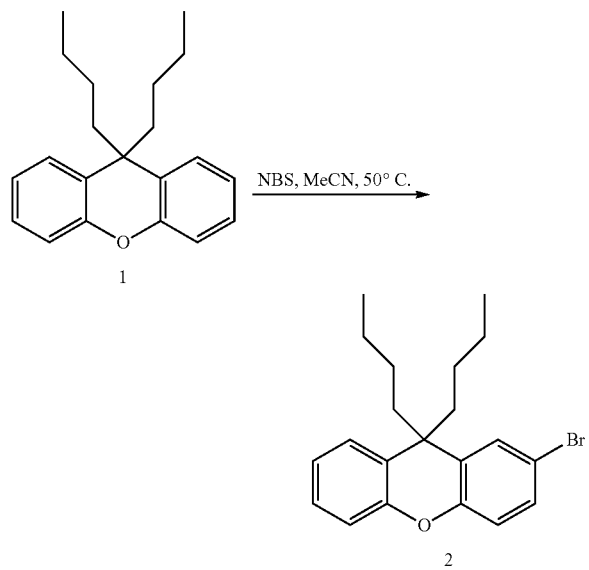

9,9-dibutyl-2-bromoxanthene (2): Compound 1 (12.5 g, 42.3 mmol) and acetonitrile (200 mL) were added to a 500 mL round-bottom flask equipped with a magnetic stir bar under atmospheric conditions. The mixture was lightly heated until homogenous and subsequently cooled to 0° C. Solid N-bromosuccinimide was added portion-wise and the reaction was stirred at 0° C. for another 30 minutes. The mixture was then heated to 50° C. for 2 h, monitored by TLC, and subsequently cooled to RT. Sodium bisulfite (10 wt %, 100 mL) was added and the resulting mixture was extracted with hexanes (3×100 mL). The combined organic phases were washed with 1 M NaOH (100 mL), de-ionized water (100 mL), brine (100 mL), dried over sodium sulfate, and filtered. The solvent was removed under reduced pressure and the resulting crude material was passed through a short hexanes silica plug resulting in 12.5 g (88% yield) of an inseparable mixture comprised of compound 1 (5 mol %), compound 2 (85 mol %), and 2,7-dibromoxanthene (10 mol %), manifested as a colorless oil. This mixture was used in the subsequent step without further purification.

Example 3: Synthesis of compound 3

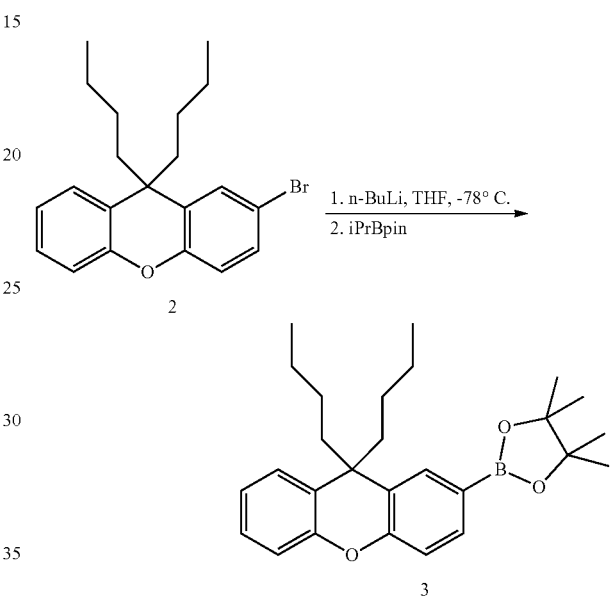

9,9-Dimethyl-2-(4,4,5,5-tetramethyl-1,3,2-dioxaborolan-2-yl)-9H-xanthene (3): A mixture containing mostly compound 2 (4.00 g, 10.1 mmol) and anhydrous THF (50 mL) were added to an oven-dried 200 mL Schlenk flask equipped with a magnetic stirbar under anhydrous conditions. The flask cooled to −78° C. for 20 minutes before n-BuLi (6.0 mL, 15.0 mmol, 2.5 M in Hexanes) was added dropwise and the reaction was left to stir at this temperature for 1 h. 2-Isopropoxy-4,4,5,5-tetramethyl-1,3,2-dioxaborolane (3.17 mL, 15.5 mmol) was added dropwise at −78° C. after which the reaction was warmed to RT for 12 h. The reaction was monitored via TLC until the starting material was no longer observed. The flask was then cooled to 0° C. in an ice-water bath, water (50 mL) was added and the mixture was stirred at room temperature for 30 min before being extracted with chloroform (3×75 mL). The combined organic phase was washed with water (2×50 mL), brine (50 mL), dried over Na$_2$SO$_4$, and filtered. The solvent was removed under reduced pressure and the resulting crude material was purified via column chromatography (SiO$_2$: 2.5% EtOAc in Hexanes) yielding compound 3 (3.55 g, 79%) as a colorless oil. $^1$H NMR (400 MHz, CDCl$_3$, 25° C.) δ7.71 (d, J=1.5 Hz, 1H), 7.63 (dd, J=8.1, 1.5 Hz, 1H), 7.28 (dd, J=7.8, 1.6 Hz, 1H), 7.18 (ddd, J=8.1, 7.1, 1.6 Hz, 1 H), 7.09-7.04 (m, 1 H), 7.02-6.96 (m, 2H), 1.95 (dddd, J=44.0, 13.6, 9.7, 6.5 Hz, 4H), 1.36 (s, 12H), 1.10 (dtd, J=14.1, 7.2, 2.8 Hz, 4H), 0.87-0.76 (m, 4H), 0.69 (t, J=7.3 Hz, 6H). $^{13}$C NMR (100 MHz, CDCl$_3$, 25° C.) δ154.35, 151.67, 134.14, 133.52, 127.24, 126.43, 126.14, 125.16, 123.29, 116.11, 115.56, 83.76, 45.31 (2C), 42.21, 27.17 (2C), 25.07 (4C), 24.97 (2C), 23.09 (2C), 13.99 (2C). HRMS (ESI-TOF) m/z: [M+H]$^+$ Calculated for $C_{27}H_{38}BO_3$ 421.2909; Found 421.2910.

Example 4: Synthesis of Compound 4

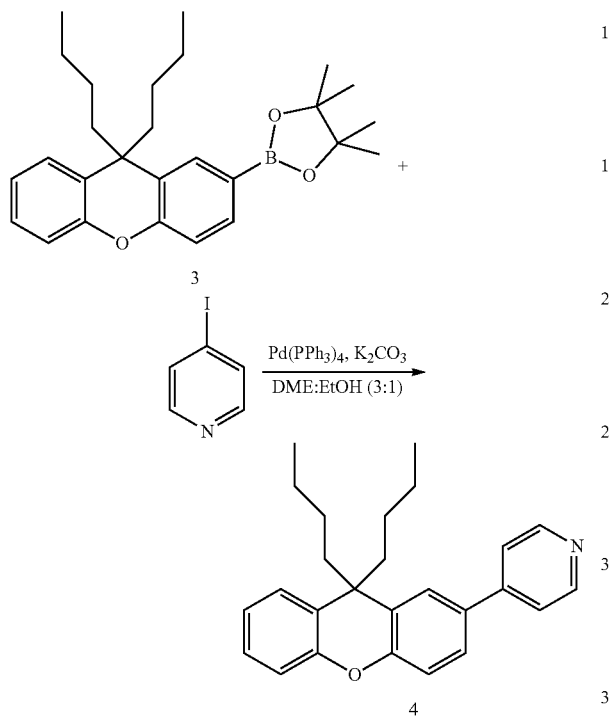

4-(9,9-dibutyl-9H-xanthen-2-yl)pyridine (4): Compound 3 (2.58 g, 6.19 mmol), freshly sublimated 4-iodopyridine (1.15 g, 5.62 mmol), potassium carbonate (2.57 g, 18.6 mmol), and Pd(PPh$_3$)$_4$ (710 mg, 0.62 mmol) were added to an oven-dried 200 mL Schlenk flask equipped with a magnetic stirbar and reflux condenser. The flask was placed under an atmosphere N$_2$ gas before de-oxygenated 1,2 dimethoxyethane (20 mL) and EtOH (7 mL) were added via syringe under positive N$_2$ flow and the reaction was then heated to 90° C. for 12 h, monitored by TLC until the starting materials were no longer observed. The flask was then cooled to RT before water (50 mL) was added and the mixture was extracted with chloroform (3×50 mL). The combined organic phase was washed with water (2×50 mL), brine (50 mL), dried over Na$_2$SO$_4$, and filtered. The solvent was removed under reduced pressure and the resulting crude material was purified via column chromatography (SiO$_2$: gradient 20-40% EtOAc in Hexanes) yielding compound 4 (2.00 g, 87%) as a colorless oil. $^1$H NMR (400 MHz, CDCl$_3$, 25° C.) δ8.84-8.38 (m, 2H), 7.50 (d, J=2.3 Hz, 1 H), 7.49-7.45 (m, 2H), 7.43 (dd, J=8.5, 2.3 Hz, 1 H), 7.24 (dd, J=7.8, 1.6 Hz, 1H), 7.14 (ddd, J=8.1, 7.2, 1.6 Hz, 1H), 7.08-7.00 (m, 2H), 6.96 (dd, J=8.1, 1.3 Hz, 1 H), 2.01-1.72 (m, 4H), 1.07 (h, J=7.2 Hz, 4H), 0.91-0.71 (m, 4H), 0.64 (t, J=7.3 Hz, 6H). $^{13}$C NMR (100 MHz, CDCl$_3$, 25° C.) δ153.05, 151.51, 149.52 (2C), 148.97, 132.50, 127.55, 126.80, 126.37, 126.24, 125.35, 125.17, 123.65, 121.51 (2C), 117.15, 116.26, 45.42 (2C), 42.53, 27.15 (2C), 23.08 (2C), 13.99 (2C). HRMS (ESI-TOF) m/z: [M+H]$^+$ Calculated for $C_{26}H_{30}NO$ 372.2322; Found 372.2326.

Example 5: Synthesis of Compound 5

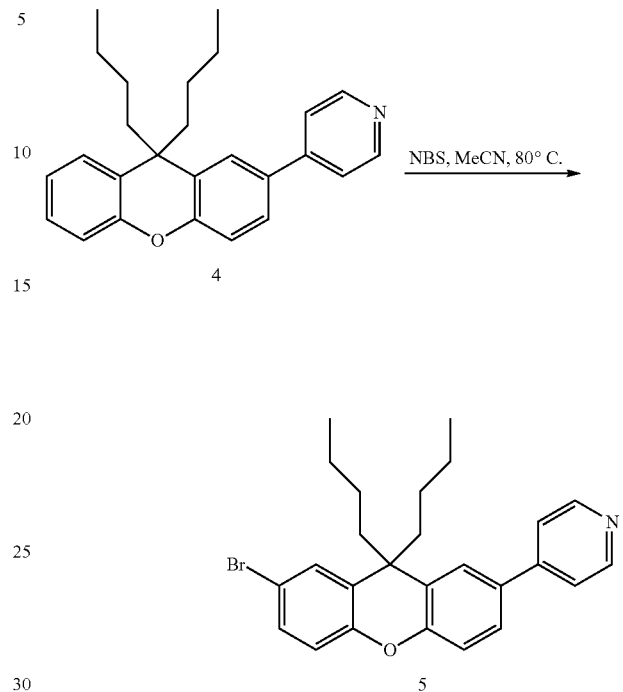

4-(7-bromo-9,9-dibutyl-9H-xanthen-2-yl)pyridine (5): Compound 4 (2.00 g, 5.38 mmol) was added to a 100 mL round bottom flask equipped with a magnetic stirbar under air-free conditions. Anhydrous acetonitrile (30 mL) was injected under positive N$_2$ flow and the flask was stirred at RT until compound 4 completely dissolved. An air-free solution of N-bromosuccinimide (1.92 g, 10.76 mmol) in anhydrous acetonitrile (20 mL) was added dropwise to the reaction vessel and the mixture was heated to 80° C. for 12 h, monitored by TLC (Note: The starting material and product of this reaction look nearly identical on TLC, it was used but is not particularly helpful for checking the reaction progress in this instance). The reaction was then cooled to RT and poured into a 10 wt % solution of sodium bisulfite. This biphasic mixture was mixed vigorously at RT for approximately 2 h before extracting with chloroform (40× mL). The combined organic phase was washed with de-ionized water (3×50 mL), brine (50 mL), dried over Na$_2$SO$_4$ and filtered. The solvent was removed under reduced pressure and the resulting crude mixture was purified via column chromatography (SiO$_2$: gradient 20-40% EtOAc in hexanes) yielding compound 5 (1.81 g, 75%) as an orange oil that crystallizes upon standing. $^1$H NMR (400 MHz, CDCl$_3$, 25° C.) δ8.62-8.57 (m, 2H), 7.63-7.59 (m, 2H), 7.55 (d, J=2.3 Hz, 1 H), 7.52 (dd, J=8.5, 2.2 Hz, 1 H), 7.40 (d, J=2.3 Hz, 1 H), 7.32 (dd, J=8.6, 2.3 Hz, 1H), 7.14 (d, J=8.4 Hz, 1H), 6.93 (d, J=8.7 Hz, 1H), 2.03-1.84 (m, 4H), 1.22-1.05 (m, 4H), 0.95-0.76 (m, 4H), 0.72 (t, J=7.3 Hz, 6H). $^{13}$C NMR (100 MHz, CDCl$_3$, 25° C.) δ153.21, 150.87, 150.47, 147.31 (2C), 131.73, 130.79, 129.16, 127.65, 126.67, 126.52, 125.38, 122.57 (2C), 118.23, 117.54, 116.16, 45.48 (2C), 42.90, 27.14 (2C), 22.99 (2C), 13.99 (2C). HRMS (ESI-TOF) m/z: [Calculated for $C_{26}H_{29}BrNO$ 450.1427; Found 450.1439.

Example 6: Synthesis of Compound 6

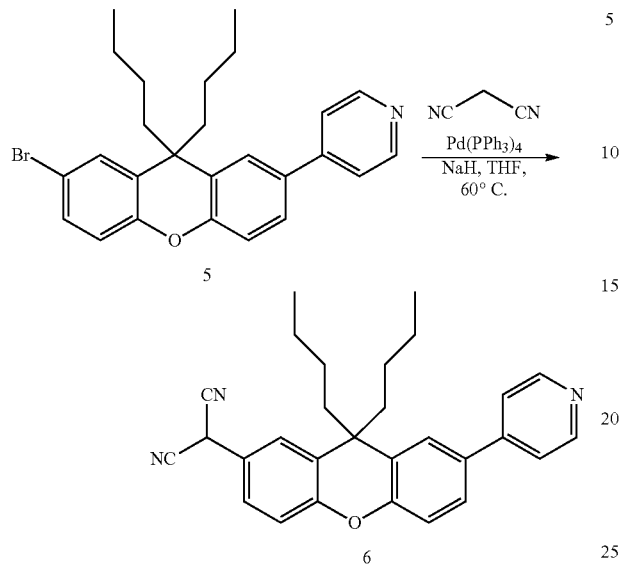

2-(9,9-Dibutyl-7-(pyridin-4-yl)-9H-xanthen-2-yl)malonontrile (6): Sodium hydride (235 mg, 5.88 mmol, 60 wt % in oil) was added to an oven-dried 100 mL Schlenk flask under air-free conditions and was dispersed in anhydrous THF (2 mL). The flask was cooled to 0° C. before a solution of malonitrile (0.5 mL, 1.83 mmol, 3.66 M in THF) was added dropwise causing the evolution of hydrogen gas. The reaction mixture was then warmed to RT and stirred for 2 h. Separately, compound 5 (660 mg, 1.47 mmol) and Pd(PPh$_3$)$_4$ 7(170 mg, 0.15 mmol) were added to a 50 mL Schlenk flask, dissolved in anhydrous THF (3 mL), and slowly injected via syringe to the sodium hydride/malonitrile mixture. The reaction was then heated to 80° C. for 12 h, monitored by TLC until the starting material was no longer present. The flask was then cooled to RT before de-ionized water was added slowly causing the evolution of more hydrogen gas. The resulting mixture was then carefully neutralized using 1 M hydrochloric acid until a pH of approximately 7.0 had been achieved. This mixture was then extracted with chloroform (3×30 mL) resulting in a solution that was visibly blue or purple in appearance. The combined organic phase was washed with de-ionized water (3×30 mL), brine (30 mL), dried over Na$_2$SO$_4$ and filtered. The solvent was removed under reduced pressure and the resulting crude material was purified via flash chromatography (SiO$_2$: gradient 30-45% EtOAc: Hexanes) yielding compound 6 (407 mg, 65%) as a dark-colored oil that crystallizes to a light blue solid upon standing (Note: This product does not appear to be particularly stable for extended periods of time, it is recommended to move on to the next step as soon as possible). $^1$H NMR (400 MHz, Chloroform-d) δ8.70-8.63 (m, 2H), 7.56 (d, J=2.2 Hz, 1 H), 7.54-7.48 (m, 3H), 7.42 (d, J=2.4 Hz, 1 H), 7.35 (dd, J=8.5, 2.4 Hz, 1H), 7.16 (d, J=5.1 Hz, 1H), 7.14 (d, J=5.0 Hz, 1H), 5.12 (s, 1H), 2.12-1.88 (m, 4H), 1.16 (h, J=7.3 Hz, 4H), 0.93-0.77 (m, 4H), 0.73 (t, J=7.3 Hz, 6H). $^{13}$C NMR (100 MHz, CDCl$_3$, 25° C.) δ152.91, 152.09, 150.26 (2C), 148.02, 133.74, 127.81, 126.62, 126.57, 125.84, 125.53, 124.98, 121.45 (2C), 120.92, 118.19, 117.24, 112.01, 45.36 (2C), 42.98, 27.97, 27.14 (2C), 22.91 (2C), 13.93 (2C). HRMS (ESI-TOF) m/z: [M 30 H]$^+$ Calculated for C$_{29}$H$_{30}$N$_3$O 436.2383; Found 436.2398.

Example 7: Synthesis of compound E1

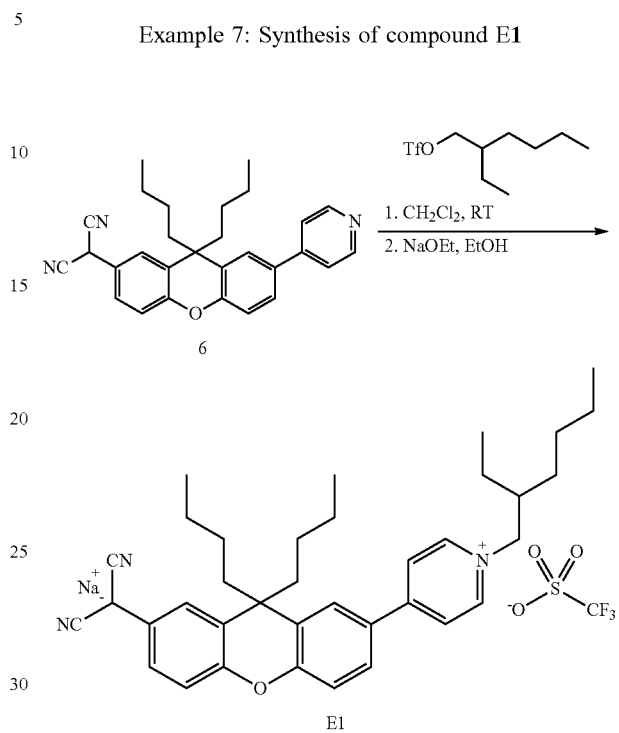

Dicyano(9,9-dibutyl-7-(1-(2-ethylhexyl)pyridin-1-ium-4-yl)-9H-xanthen-2-yl)methanide (E1): Compound 6 (430 mg, 0.99 mmol) was added to a 50 mL Schlenk flask equipped with a magnetic stirbar under air-free conditions. Anhydrous CH$_2$Cl$_2$ (24 mL) was injected under positive N$_2$ flow and left to stir at RT for approximately 30 minutes. Freshly prepared 2-ethyl hexyl triflate[2] (288 mg, 1.11 mmol) was added dropwise and the reaction was left at RT for an additional 12 h. The reaction was monitored by TLC until the starting material was no longer observed. Sodium ethoxide (1.0 ml, 2.5 mmol, 21 wt % in ethanol) was added dropwise and the reaction was left stirring for approximately 30 min. The solvent was removed under reduced pressure and the resulting crude was purified dispersed in water and filtered. The solid crude was purified via column chromatography (SiO$_2$: gradient 0 to 5% MeOH in CH$_2$Cl$_2$) resulting in compound E1 (400 mg, 55%) as a dark purple solid. mp 154-177° C. $^1$H NMR (400 MHz, DMSO-d$_6$, 25° C.) δ8.99 (d, J=6.8 Hz, 2H), 8.61-8.55 (m, 2H), 8.23 (d, J=2.4 Hz, 1 H), 8.00 (dd, J=8.7, 2.3 Hz, 1 H), 7.19 (d, J=8.6 Hz, 1 H), 6.82 (d, J=8.5 Hz, 1 H), 6.72 (s, 1 H), 6.67-6.57 (m, 1H), 4.48 (d, J=7.6 Hz, 2H), 2.18 (td, J=12.9, 12.5, 4.5 Hz, 2H), 2.01 (d, J=10.6 Hz, 1H), 1.90 (td, J=12.9, 4.4 Hz, 2H), 1.38-1.17 (m, 6H), 1.10 (q, J=7.4 Hz, 4H), 0.93-0.80 (m, 7H), 0.67 (t, J=7.3 Hz, 9H). $^{13}$C NMR (100 MHz, DMSO-d$_6$, 25° C.) δ154.80, 153.84, 144.56 (2C), 142.86, 137.25, 127.58, 127.40, 127.17, 126.88, 126.59, 124.41, 123.31 (2C), 117.81, 116.97, 115.75, 114.03, 62.80, 44.16 (2C), 42.26, 28.92, 27.53, 26.94 (2C), 26.41, 22.36 (4C), 22.20, 13.87, 13.80, 13.74 (2C), 9.97. $^{19}$F NMR (376 MHz, DMSO-d$_6$, 25° C.) δ-80.1 ppm. HRMS (ESI-TOF) m/z: [M+H]$^+$ Calculated for C$_{37}$H$_{46}$N$_3$O 548.3633; Found 548.3662. m.p. 154-180° C.

Example 8: Synthesis of Compound 7

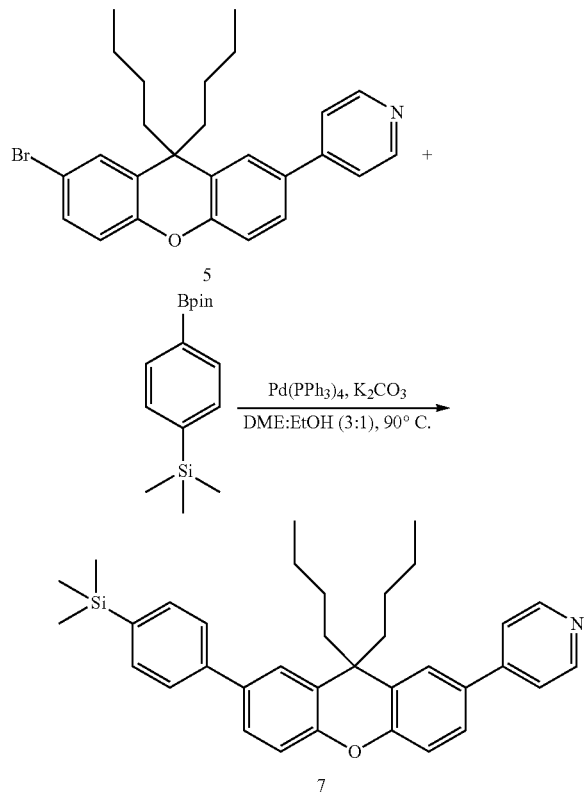

4-(9,9-Dibutyl-7-(4-(trimethylsilyl)phenyl)-9H-xanthen-2-yl)pyridine (7): Compound 5 (1.75 g, 3.88 mmol), tetramethyl-2-[4-(trimethylsilyl)phenyl]-1,3,2-dioxaborolane (1.22 g, 4.66 mmol), Pd(PPh$_3$)$_4$ (448 mg, 0.39 mmol), and K$_2$CO$_3$ (1.61 g, 11.64 mmol) were added to a 100 mL Schlenk flask under air-free conditions. De-oxygenated 1,2 dimethoxyethane (12 mL) and ethanol (4 mL) were injected via syringed under positive N$_2$ flow and the reaction was heated to 90° C. for 12 h, observed by TLC (Note: As before, retention factor of starting material and product are extremely similar, there is a difference in fluorescence at 254 nm between 5 and 7 which was the primary method of verification for this reaction). The reaction was then cooled to RT, de-ionized water (20 mL) was added, and the mixture was then extracted with chloroform (3×50 mL). The combined organic phase was washed with water (3×50 mL), brine (50 mL), dried over Na$_2$SO$_4$ and filtered. The solvent was removed under reduced pressure and the resulting crude was purified via flash chromatography (SiO$_2$: gradient 20-40% EtOAc: Hexanes) yielding compound 7 (1.59 g, 79%) as a colorless oil that crystallizes upon standing. $^1$H NMR (400 MHz, CDCl$_3$, 25° C.) δ8.67 (d, J=6.3 Hz, 2H), 7.63 (d, J=8.3 Hz, 2H), 7.60-7.56 (m, 3H), 7.55-7.50 (m, 4H), 7.46 (dd, J=8.4, 2.2 Hz, 1H), 7.15 (d, J=8.4 Hz, 1H), 7.11 (d, J=8.4 Hz, 1H), 2.03 (dt, J=8.8, 6.0 Hz, 4H), 1.15 (q, J=7.3 Hz, 4H), 0.92 (q, J=7.4, 6.7 Hz, 5H), 0.72 (t, J=7.3 Hz, 6H), 0.32 (s, 9H). $^{13}$C NMR (100 MHz, CDCl$_3$, 25° C. C) δ152.92, 151.18, 149.79 (2C), 148.72, 141.40, 139.16, 136.54, 134.04 (2C), 132.74, 126.65, 126.44, 126.31 (2C), 126.28, 125.62, 125.18, 125.06, 121.49 (2C), 117.19, 116.66, 45.48 (2C), 42.77, 27.19 (2C), 23.08 (2C), 14.02 (2C), −0.92 (3C). HRMS (ESI-TOF) m/z: [M]$^+$ Calculated for C$_{35}$H$_{41}$SiNO 519.2952; Found 519.3030.

Example 9: Synthesis of Compound 8

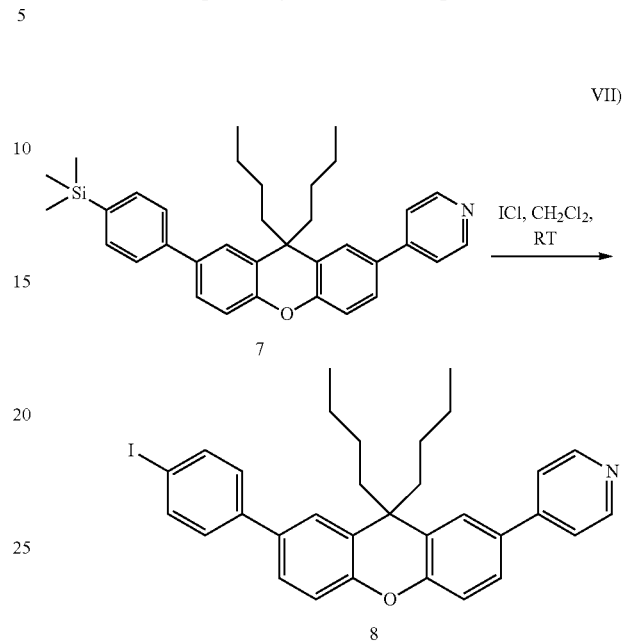

4-(9,9-Dibutyl-7-(4-iodophenyl)-9H-xanthen-2-yl)pyridine (8): Compound 7 (1.55 g, 2.88 mmol) was added to an oven-dried 100 mL Schlenk flask under air-free conditions. Anhydrous CH$_2$Cl$_2$ (15 mL) was injected via syringe under positive N$_2$ flow and the solution was cooled to 0° C. in an ice-water bath for 20 minutes. A solution of iodine monochloride (5.76 mL, 1.0 M in CH$_2$Cl$_2$) was added dropwise and the flask was warmed to RT and stirred for 4 hours, monitored by TLC (Note: As in the previous examples, retention factor is not helpful. The disparity in visible fluorescence at 254 nm between 7 and 8 is the best metric available for benchtop analysis). A solution of 10 wt % sodium bisulfite (20 mL) was then added and the biphasic mixture was mixed vigorously for 2 hours before the aqueous portion was partitioned and extracted with CH$_2$Cl$_2$ (2×30 mL). The combined organic phase was washed with de-ionized water (2×50 mL), brine (50 mL), dried over Na$_2$SO$_4$, and filtered. The solvent was removed under reduced pressure and the resulting crude material was purified via a short silica plug resulting in compound 8 (1.45 g, 89%) as an off-white solid. $^1$H NMR (400 MHz, CDCl$_3$, 25° C.) δ8.74-8.65 (m, 2H), 7.78 (d, J=8.4 Hz, 1 H), 7.59 (s, 1 H), 7.56-7.50 (m, 3H), 7.47 (d, J=2.2 Hz, 1 H), 7.41 (dd, J=8.4, 2.2 Hz, 1 H), 7.35-7.29 (m, 2H), 7.15 (d, J=8.5 Hz, 1 H), 7.11 (d, J=8.4 Hz, 1H), 2.16-1.95 (m, 4H), 1.15 (p, J=7.3 Hz, 4H), 0.91 (ddd, J=12.9, 7.7, 5.2 Hz, 4H), 0.72 (t, J=7.3 Hz, 6H). $^{13}$C NMR (100 MHz, CDCl$_3$, 25° C. δ152.81, 151.41, 149.80 (2C), 148.67, 140.52, 138.02 (2C), 135.48, 132.87, 128.84 (2C), 126.52, 126.35, 126.25, 125.89, 125.17, 124.77, 121.50 (2C), 117.21, 116.86, 92.70, 45.47 (2C), 42.79, 27.18 (2C), 23.06 (2C), 14.01 (2C). HRMS (ESI-TOF) m/z: [M +H]$^+$ Calculated for C$_{32}$H$_{33}$INO 574.1601; Found 574.1627.

Example 10: Synthesis of Compound 9

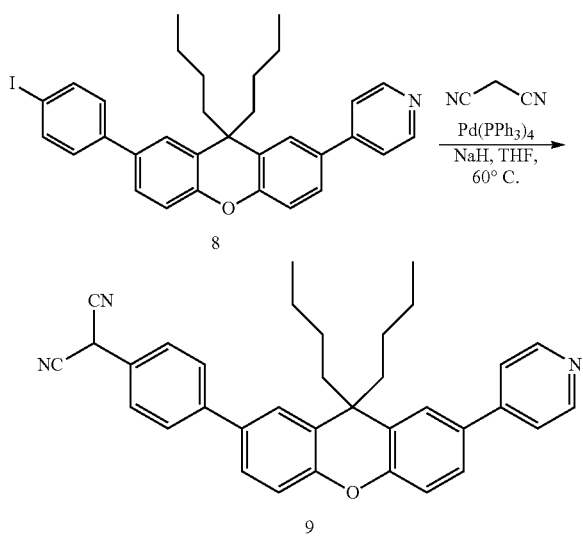

2-(4-(9,9-Dibutyl-7-(pyridin-4-yl)-9H-xanthen-2-yl)phenyl)malononitrile (9): Sodium hydride (139 mg, 3.48 mmol, 60 wt % in oil) was added to an oven-dried 100 mL Schlenk flask under air-free conditions and was dispersed in anhydrous THF (2 mL). The flask was cooled to 0° C. before a solution of malonitrile (0.5 mL, 1.08 mmol, 2.18 M in THF) was added dropwise causing the evolution of hydrogen gas. The reaction mixture was then warmed to RT and stirred for 2 h. Separately, compound 7 (500 mg, 0.87 mmol) and Pd(PPh$_3$)$_4$ (50 mg, 0.04 mmol) were added to a 50 mL Schlenk flask and dissolved in anhydrous THF (3 mL) and slowly injected via syringe to the sodium hydride/malonitrile mixture. The reaction was then heated to 60° C. for 6 h, monitored by TLC until the starting material was no longer present. The flask was then cooled to RT before de-ionized water was added slowly causing the evolution of more hydrogen gas. The resulting mixture was then carefully neutralized using 1 M hydrochloric acid until a pH of approximately 7.0 had been achieved. This mixture was then extracted with chloroform (3×30 mL) resulting in a solution that was visibly blue or purple in appearance. The combined organic phase was washed with de-ionized water (3×30 mL), brine (30 mL), dried over Na$_2$SO$_4$ and filtered. The solvent was removed under reduced pressure and the resulting crude material was purified via flash chromatography (SiO$_2$: gradient 30-45% EtOAc: Hexanes) yielding compound 9 (262 mg, 59%) as a dark-colored oil that crystallizes upon standing (Note: This product does not appear to be particularly stable for extended periods of time, it is recommended to move on to the next step as soon as possible). $^1$H NMR (400 MHz, CDCl$_3$, 25° C.) δ8.73-8.64 (m, 2H), 7.72-7.66 (m, 2H), 7.62-7.58 (m, 3H), 7.55-7.50 (m, 4H), 7.45 (dd, J=8.4, 2.2 Hz, 1H), 7.16 (d, J=6.3 Hz, 1H), 7.14 (d, J=6.2 Hz, 1H), 5.14 (s, 1H), 2.17-1.95 (m, 4H), 1.17 (h, J=7.3 Hz, 4H), 0.99-0.86 (m, 4H), 0.73 (t, J=7.3 Hz, 6H). $^{13}$C NMR (100 MHz, CDCl$_3$, 25° C.) δ152.69, 151.83, 149.91 (2C), 148.54, 143.30, 134.76, 133.06, 128.47 (2C), 127.86 (2C), 126.54, 126.41, 126.14, 125.14 (2C), 124.78, 121.49 (3C), 117.23, 117.06, 111.87, 100.13, 45.47 (2C), 42.82 (2C), 28.02, 27.19 (2C), 23.05 (2C), 14.01 (2C). HRMS (ESI-TOF) m/z: [M]$^+$ Calculated for C$_{35}$H$_{33}$N$_3$O 511.2624; Found 511.2619.

Example 11: Synthesis of Compound E2a

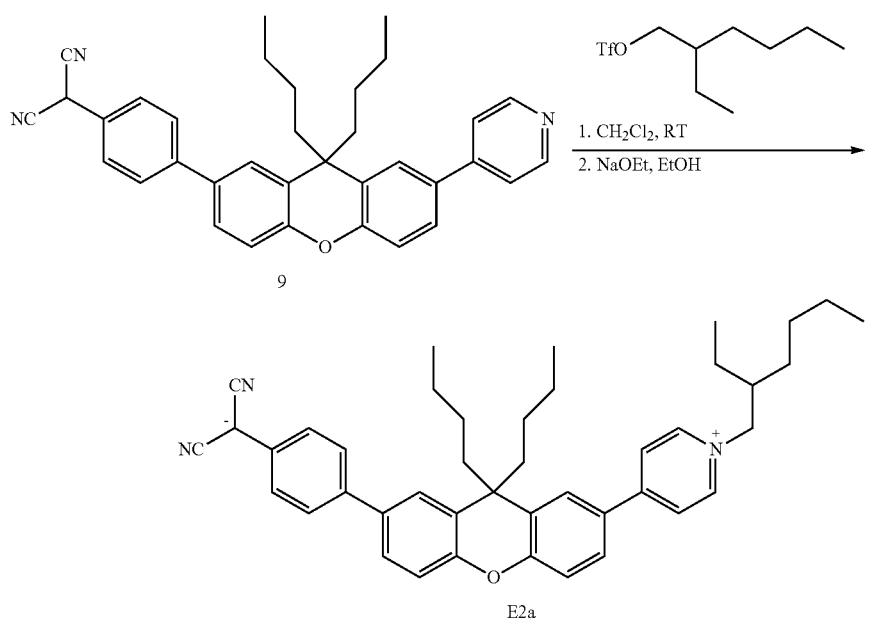

Dicyano(4-(9,9-dibutyl-7-(1-(2-ethylhexyl)pyridin-1-ium-4-yl)-9H-xanthen-2-yl)phenyl)methanide (E2a): Compound 9 (250 mg, 0.49 mmol) was added to an oven-dried 50 mL Schlenk flask under air-free conditions. Anhydrous CH$_2$Cl$_2$ (10 mL) was injected via syringe and the reaction mixture was left to stir at RT for 20 minutes. Freshly prepared 2-ethylhexyl triflate[2] was injected via syringe and the reaction was left to stir at RT for 12 h, monitored by TLC until the starting material was no longer present. Sodium ethoxide (0.25 mL, 21 wt %) was then added dropwise causing the solution to turn a dark shade of red. The reaction was left to stir at RT for approximately 30 minutes before water (10 mL) was added. The resulting biphasic mixture was separated and the aqueous phase was extracted with $CH_2Cl_2$ (2×10 mL). The combined organic phase was washed with water (20 mL), brine (20 mL), dried over $Na_2SO_4$ and filtered. The solvent was removed under reduced pressure resulting crude was washed with 1:1 hexanes:$CH_2Cl_2$ yielding E2a (226 mg, 73%) as a bright red solid. mp 199-203° C. $^1H$ NMR (400 MHz, DMSO-$d_6$, 25° C.) δ9.02 (d, J=6.6 Hz, 2H), 8.64-8.56 (m, 2H), 8.29 (d, J=2.3 Hz, 1 H), 8.04 (dd, J=8.7, 2.2 Hz, 1 H), 7.63 (d, J=2.2 Hz, 1 H), 7.45 (dd, J=8.5, 2.1 Hz, 1 H), 7.39 (d, J=8.5 Hz, 2H), 7.27 (d, J=8.7 Hz, 1 H), 7.07 (d, J=8.5 Hz, 1 H), 6.81 (d, J=8.4 Hz, 2H), 4.48 (d, J=7.6 Hz, 2H), 2.32-2.10 (m, 4H), 2.09-1.94 (m, 1H), 1.36-1.18 (m, 8H), 1.10 (q, J=7.4 Hz, 4H), 0.90-0.83 (m, 6H), 0.76-0.60 (m, 10H). $^{13}C$ NMR (100 MHz, DMSO-$d_6$, 25° C.) δ154.26, 153.77, 148.71, 144.65 (2C), 140.90, 136.75, 128.02, 127.91, 127.83, 127.39, 127.09, 126.22 (2C), 125.94, 125.06, 124.77, 123.53 (2C), 122.83, 118.45 (2C), 117.13, 116.05, 62.89, 44.07 (2C), 42.51, 28.92, 27.89, 27.53, 27.04 (2C), 22.36 (2C), 22.26 (2C), 13.86, 13.78 (3C), 9.96. $^{19}F$ NMR (376 MHz, DMSO-$d_6$, 25° C.) δ−80.1 ppm. HRMS (ESI-TOF) m/z: $[M+H]^+$ Calculated for $C_{43}H_{50}N_3O_3$ 624.3948; Found 624.3923. m.p. 199-203° C.

Example 12

FIG. 1 provides the ATR-FTIR spectra for E1 and E2a-b. There are sharp peaks ranging from 1000 cm-1 to 1650 cm-1 representing C—C and C—H aromatic stretching modes. Two sharp and intense peaks for E1 and E2a at approximately 2160 cm-1 and 2100 cm-1 for both compounds correspond to CEN stretches representing the electron donor. The same two peaks at 2160 cm-1 and 2100 cm-1 are present for E2b albeit with less intensity in comparison to E1 and E2a. The presence of these two peaks is critical because cyano-substituents only appear with discernable intensity when they are adjacent to an abundance of electron density, such as within the methanide carbanion in E1 and E2a-b. There are additional peaks at 1467 cm-1, 800 cm-1, 820 cm-1 and 1256 cm-1, which represent a C—N pyridinium stretch, and symmetric C—O—C stretches. Results from these spectra coincide with the structures identified using NMR. The chemical structures for E1 and E2a-b are further supported by the matching m/z values for the $[M+H]^+$ we observe from high resolution LC-MS (ESI) of 548.3662, 624.3923, and 736.5173, respectively.

Example 13

Figure 2:
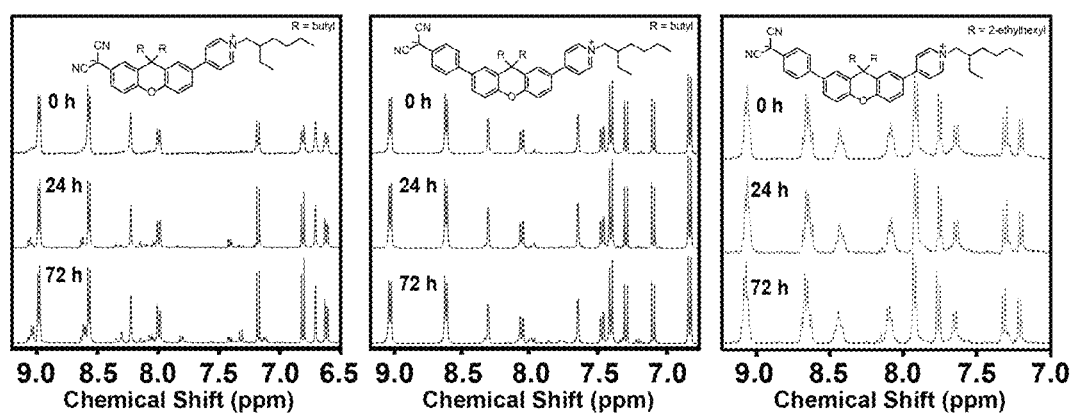
FIG. 2. Stability tests of chromophores dissolved in DMSO-$d_6$ under ambient conditions and measured at 0, 24, and 72 h.

Structure Stability. 1H NMR and TGA analysis provide details of the moisture, air, and thermal stability. FIG. 2 provides 1H NMR spectra for E1 and E2a-b upon exposure to air with ambient moisture over 72 h. The spectra indicate that while E2a-b are largely stable, E1 shows significant degradation over 72 h. E2a-b eventually degrade over a much longer period (>1 week, not shown). This behavior is notably different from previous TICT chromophores where chemical stability decreases with increasing molecular length resulting from a stronger charge localization on the hygroscopic, nucleophilic dicyanomethanide.1 E1's lower stability likely stems from proximity of the dicyanomethanide carbanion to the electron donating properties of xanthene's central ethereal oxygen, which is a structural feature that is unique to this TICT class. When performing degradation studies under light and dark conditions we observed no discernible differences between the two conditions (not shown).

TGA analysis for E1 and E2a-b. Weight loss for E1 begins gradually when heating from room temperature to ca. 270° C. after which a sharp decrease in slope indicates decomposition up to 70% weight loss by 450° C. Following a negatively sloped shoulder from ca 450° C. to 525° C., a sharp increase in weight loss occurs until 100% degradation near 600° C. E2a exhibits ca. 10% weight loss gradually through 100° C., likely due to the loss of water. The weight remains nearly constant from 100° C. to ca. 325° C. wherein a sharp increase in weight loss occurs leading to 100% degradation near 575° C. E2b exhibits negligible weight loss until ca. 350° C. wherein an abrupt −45% weight loss occurs. Following a slight negatively sloped shoulder, the remaining weight is lost abruptly between ca. 450° C. and 580° C. The difference in TGA results between chromophores is likely due to the increased stability and hydrophobicity of E2b relative to E1 or E2a. In considering melting temperature, E1 being the smallest chromophore has the lowest melting temperature with a melting point on-set of 55° C. and is completely melted at 76° C. The melting temperature for E2a is higher than for E2b with respective ranges: 199° C.-203° C. and 154° C.-180° C. Collective results from the stability tests (light, air, and thermal) suggest that the chromophores are sufficiently thermally stable for thermally assisted electric poling in an inert atmosphere.

Example 14

Figure 3:
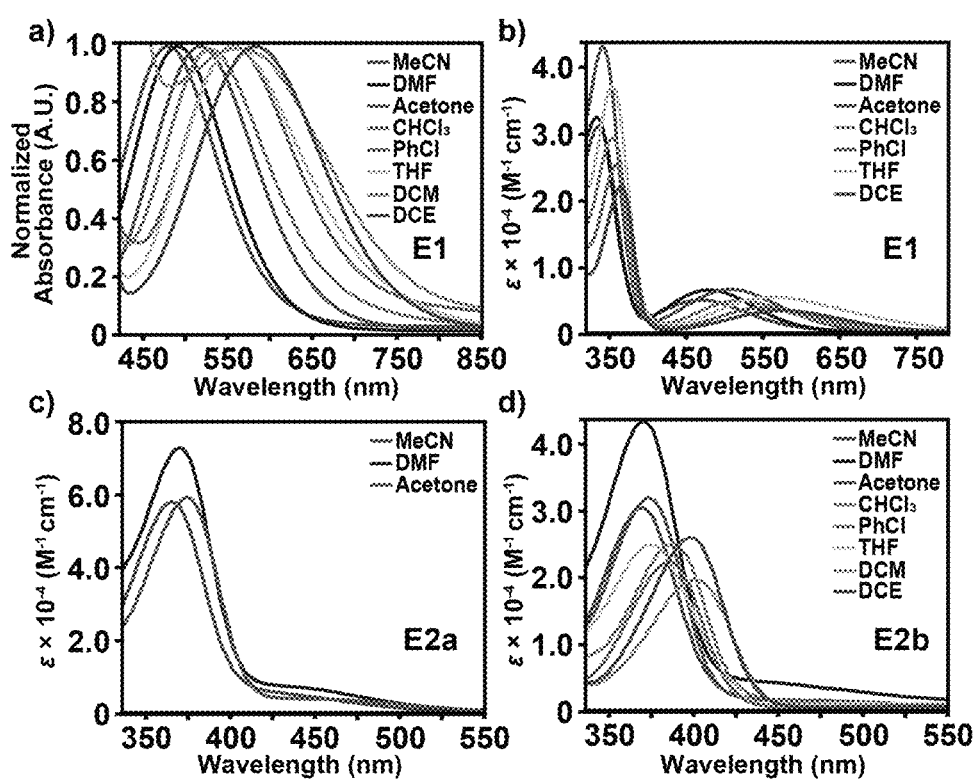

UV-vis Analysis. Evaluating the optical properties of E1 and E2a-b provide information about the electronic properties of their conjugated structures. Table 1 provides the Amax and an estimation of the indirect bandgap for E1 and E2a-b. FIG. 3a

TABLE 1

Dihedral angles and band gap values for E1 and E2a-b.

| | Twist Angle (degrees) | | Band Gap, ΔE (eV) | | |
|---|---|---|---|---|---|
| Structure | bridge-accepter | bridge-donor | Optical | Electro-chemical | Computation |
| E1 | 11.6 | N/A | 2.05 | 2.40 | 2.40 |
| E2a | 16.8 | 25.6 | 2.37 | 2.03 | 2.96 |
| E2b | 17.4 | 35.0 | 2.33 | 2.06 | 2.96 | depicts a hypsochromic shift in the visible spectrum with increasing solvent polarity for E1. Of the solvents investigated, DCE exhibits the highest intramolecular charge transfer wavelength AICT for E1 at 593 nm, followed by $CH_2Cl_2$ at 595 nm, THF (569 nm), PhCl (559 nm), $CHCl_3$ (526 nm), acetone (517 nm), DMF (486 nm), and MeCN (476 nm) such that $DCE>CH_2Cl_2>THF>PhCl>CHCl_3>$acetone$>DMF>MeCN$ from 583 nm to 476 nm. The general negative solvatochromism trend suggests stabilization of the chromophore's ground state energy resulting in an increased HOMO-LUMO gap. FIG. 3b depicts the molar absorptivity values for the full UV-Vis spectrum of E1 in the same solvents except for $CH_2Cl_2$, which was excluded because of the nonlinear correlation between absorbance and concentration over the range analyzed (1.0 ×10$^{-4}$ M to 1.2×10$^{-5}$ M); a difference we attribute to the breaking up of an aggregate structure. The $\lambda_{max}$ values for E1 emerge in the UV region between 374 nm and 341 nm. In the same chromophore, DCE exhibits the highest Amax at 374 nm, followed by THF (369 nm), PhCl (367 nm), $CH_2Cl_2$ (365 nm), $CHCl_3$ (363 nm), acetone (350 nm), MeCN (344 nm), and DMF (341 nm) such that DCE>THF>PhCl>$CH_2Cl_2$>$CHCl_3$>acetone>MeCN>DMF. The small differences in peak trends between AIcT and Amax as a function of solvent polarity are likely attributed to the complex nature of multiple overlapping peaks corresponding to the high energy electronic transitions of molecular subfragments.

Figure 4:
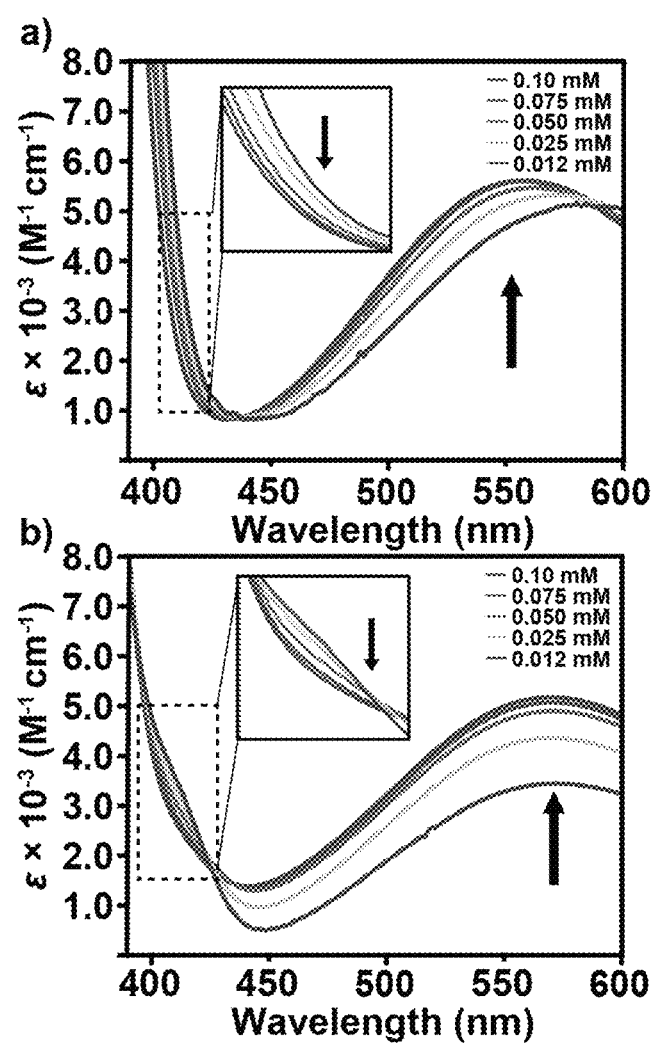
FIG. 4. Shifts in UV-Vis molar absorptivities with as a function of concentration for chromophore E1 in a) THF and b) $CHCl_3$. Arrows denote directional correlation between absorptivity and concentration.

In comparison to E1, chromophores E2a and E2b exhibit almost no spectral response in the visible region regardless of solvent or concentration choice and high levels of optical transparency in the near-IR. This observation manifests visually in solvent solutions that range in color from pale red to yellow. FIGS. 3c-d show that any discernible visible absorbance bands are broad and are largely overshadowed by the peaks in the UV region, which are likely the AIcT for these compounds. Comparison between E2a and E2b is limited by the solubility of E2a in only MeCN, DMF, and acetone. Based on these 3 solvent comparisons E2a clearly has a much larger extinction coefficient in the UV region than E2b as well as AIcT bands that extend further into the visible region. The larger extinction coefficient is likely due to the effect on solvation form the highly branched and racemic combinations of the three chiral aliphatic chains on E2b. Interestingly, for E2a and E2b there is negligible shift in absorbance values as a function of concentration, which is an uncommon characteristic of zwitterionic dyes. On the other hand, E1 exhibits a shift in wavelength and absorptivity as a function of concentration for THF, $CHCl_3$, PhCl, and $CH_2Cl_2$. The observable wavelength shifts are most prominent for THF and $CHCl_3$, FIG. 4. When analyzed in concentrations ranging from $1.0 \times 10^{-4}$ M to $1.2 \times 10^{-5}$ M, THF exhibits the largest AIcT absorbance shift of 556 nm-577 nm accompanied by a slight decrease in molar absorptivity as well as an expansion of the UV bands' right shoulder. $CHCl_3$ shows no shift in wavelength with decreasing concentration, but does exhibit a greater decrease in absorptivity and a more prominent expansion of the right side of the UV band. Concentration-based spectral shifts for PhCl and $CH_2Cl_2$ may stem from in-solution aggregation as a function of concentration, Figure S30.

Example 15

Hyper Rayleigh Scattering (HRS). The best fit experimental $\beta_{ZZZ}$ values at 900 nm in MeCN for the present chromophores are E1=(370±10)×$10^{-30}$ esu, E2a=(1,520±80)×$10^{-30}$ esu, and E2b=(1,650±150)×$10^{-30}$ esu, Table 2. These values stem from the following guidelines: First, the HRS signal is taken as the total peak area in the nonlinear scattering spectrum corresponding to the narrow hyper-Raleigh scattering at the second-harmonic wavelength of 450 nm. The peak signal results from the constant contribution from the solvent and a solute-concentration dependent contribution from the chromophores. Second, a Beer-Lambert correction factor is used for each chromophore because of the self-absorption of their generated photons at 450 nm. Third, with static $\beta_{0,ZZZ}$=0.578 ×$10^{-30}$ esu as a reference for dry solvent[23] and by using an undamped two-level model,[26] the dynamic value at 900 nm is 0.643 ×$10^{-30}$ esu. And fourth, the HRS signal (squared), ($\beta_{HRS}^2$), is interpreted as coming from a single dipolar tensor component $\beta_{ZZZ}$ as Eqn 1 because the chromophores exhibit strong charge-transfer type electronic transitions, which is supported by theoretical computation, vide infra.

$$\langle \beta_{HRS}^2 \rangle = \langle \beta_{XZZ,HRS}^2 \rangle + \langle \beta_{ZZZ,HRS}^2 \rangle = \frac{6}{35}[\beta_{zzz}]^2 \qquad \text{Eqn 1}$$

where ($\beta_{HRS}^2$) is the orientational averaged sum $\langle \beta_{XZZ,HRS}^2 \rangle$ and $\langle \beta_{ZZZ,HRS}^2 \rangle$ wherein the first subscript refers to the polarization state of the frequency doubled light, and the second and third subscripts refer to two Z-polarized laser photons. The X,Y,Z cartesian coordinates are as follows: X is the laser propagation direction, Y is the direction towards the detector (i.e., 90°), and Z is the laser polarization direction. Here, in uniaxial dipolar molecules, such as E1 and E2a-b, the coordinates reduce to an expression within the molecular frame with z being the molecular dipolar axis.[31] The HRS values for beta are larger for E2a-b, which may, in part, stem from the greater charge separation as a result

TABLE 2

μ and absolute |β| values from calculation (static) and experiment (at 900 nm in MeCN).

| Structure | Computed (M06-2x/D95+* level) | | | HRS | |
|---|---|---|---|---|---|
| | μ (Debye) | $\|\beta_{zzz}\|$ ($10^{-30}$ esu) | $\|\mu\beta_{zzz}\|$ ($10^{-48}$ esu) | $\|\beta_{zzz}\|$ ($10^{-30}$ esu) | $\|\mu\beta_{zzz}\|$ ($10^{-48}$ esu) |
| E1 | 31.1 | 945 | 29400 | 370 ± 10 | 11500 |
| E2a | 52.1 | 2300 | 121000 | 1520 ± 80 | 79900 |
| E2b | 52.1 | 2860 | 148000 | 1650 ± 150 | 86000 | of the molecules being longer.

Example 16

Computations. Quantum chemical calculations play an important role in predicting hyperpolarizability and dipole moment when designing new asymmetric chromophores. DFT affords relatively high theory level for the large molecules studied in this work in comparison to semiempirical methods used in the past. M06-2X exchange-correlation functional calculations predicts the static |β| to be as high as 2,860 ×$10^{-30}$ esu for E2b with corresponding pp of 148,000×$10^{-48}$ esu followed by |β| of 2,300 ×$10^{-30}$ esu and μβ121,000×$10^{-48}$ esu for E2a, and |β| of 945 ×$10^{-30}$ esu and μβ 3 29,400×$10^{-48}$ esu for E1, Table 2. DFT calculations often overestimate β in comparison to experimental determination by as much as 2-3 times. Such is the case in the current study wherein the computed static absolute |β| values in vacuum are a factor of 1.5 to 2.5 greater than the experimental HRS measurements at 900 nm in MeCN. A contributing factor to this difference is self-interaction error. Kohn-Sham DFT description of the electronic structure tends to overdelocalize the electrons (and hence overestimate both μ and |β|. This issue is partially mitigated by using hybrid exchange-correlation functionals with a larger fraction of exact Hartree-Fock (HF) exchange. In this case, M06-2X is a global hybrid functional with 54% HF exchange.

Figure 5:
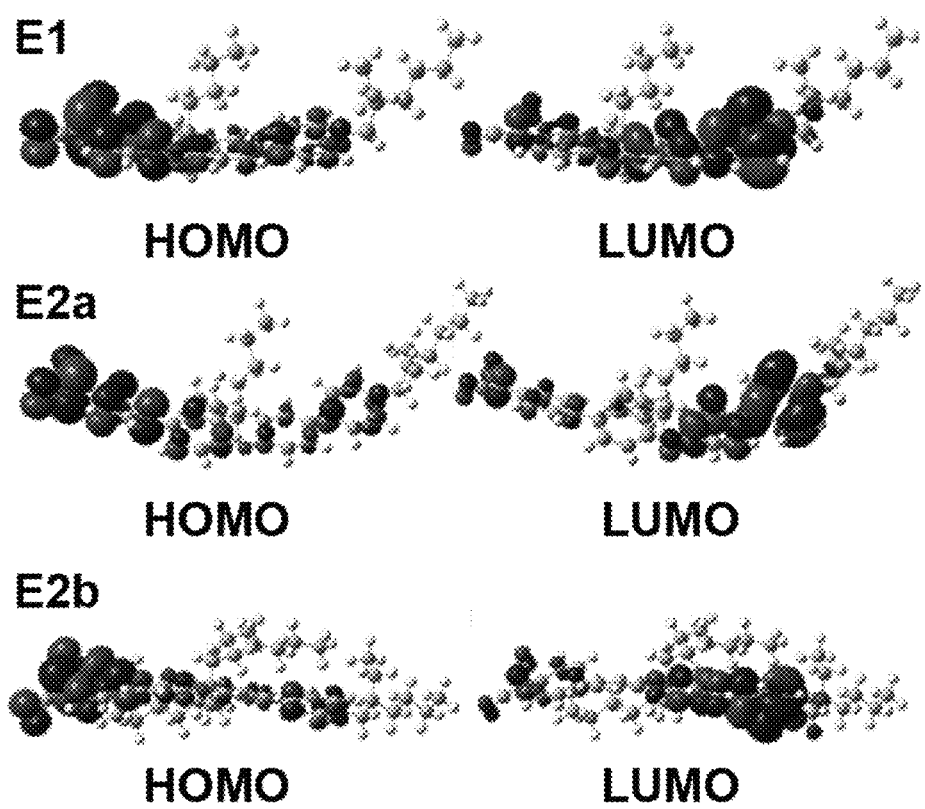
FIG. 5. Computed HOMO-LUMO for E1 and E2a-b chromophores.
Figure 6:
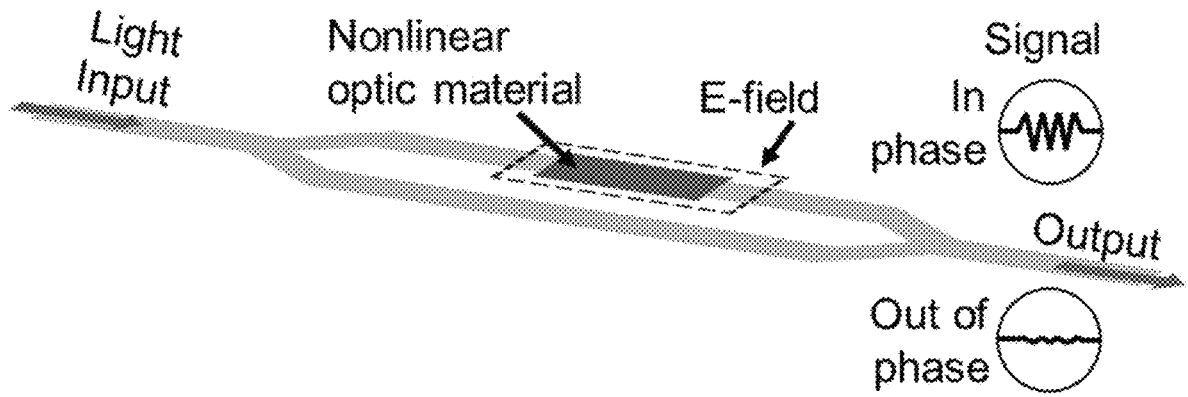
FIG. 6 is an example according to various embodiments, illustrating a prior art Mach-Zehnder interferometer.
Figure 7:
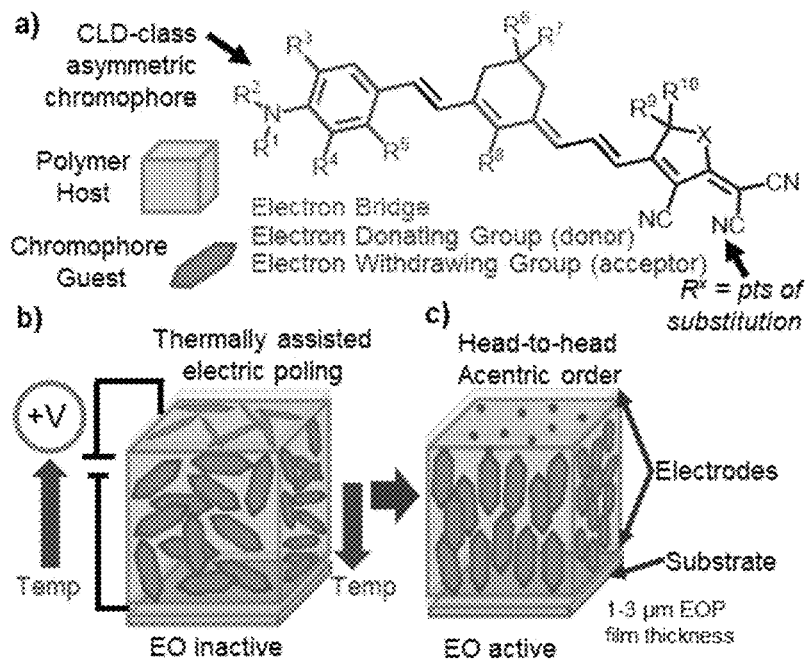
FIG. 7 is an example according to various embodiments, illustrating a prior art method for thermally-assisted electric poling.

Computed HOMO and LUMO spatial distributions for E1 and E2a-b demonstrate that the HOMO primarily localizes on the dicyanomethanide substituent while the LUMO localizes on the pyridinium cation, FIG. 5. One can observe a greater level of electron localization for compound E2a-b than compound E1 due to the increase in π-system length. Addition of the phenylene ring adjacent to the dicyanomethanide in E2a-b causes a significant increase in optical excitation energy, ΔE, from 2.40 eV for E1 to 2.96 eV for both E2a-b, Table 2. The predictions of absorption wavelength (and corresponding optical excitation energy values) are made possible via TD-DFT calculations using the M05-QX exchange-correlation functional derived by interpolation between M05 and M05-2X functionals.[29,30] The values of dipole moment, μ, also increase with the length of the molecule from 31.1 Debye for E1 to 52.5 Debye and 52.1 Debye for E2a and E2b, respectively, Table 1. The dihedral twist angle between the pyridinium ring and the xanthene bridge is 11.6° for E1 and increases to 16.8° and 17.4°, respectively for E2a and E2b. The phenylene ring positioned between the electron donating dicyanomethanide and the planar xanthene bridge in E2a-b results in an additional twist angle which increases from 25.6° for E2a to 35° for E2b. The nearly 10° increase in out-of-plane rotation is likely due to the increase in sterics stemming from the bulkier ethylhexyl substituents in comparison to the less bulky butyl substituents on E2a, Table 1. A significant observation is that the dihedral angles for E1 and E2a-b are low in comparison to other TICT chromophores with similar |μβ|, which exhibit angles exceeding 65°. Thus, future derivatives of structurally modular E1 and E2a-b with larger dihedral angles originating from bulkier substituents are likely to yield much higher |β|.

Example 17

Electrochemical Analysis. Figures S33-35 provide representative cyclic voltammograms (CV) for E1 and E2a-b. The CVs have similar shape for each chromophore with a reductive peak near −1.75 V and a pair of oxidative peaks just above and below 0.5 V (vs. $FeCp_2^+/FeCp_2$ taken at OV). An additional unidentified peak exists near 0 V for each chromophore. Changing the concentration and the scan rate does not alter the magnitude of the peak current relative to the other signals ruling out contribution from aggregation. The CV features are reoccurring and remain constant over multiple scans. Further, when comparing the HOMO-LUMO gaps to the distances between the reductive wave and the unidentified peaks, the calculated result corresponds to wavelengths of light in the near IR regions. However, the calculations do not correspond to experimental or computational observations and are thus unsuitable to consider. Instead, calculation of the electrochemical band gaps using the designated reductive peak and the first oxidative peak, yields respective E1, E2a, and E2b values of 1.99 eV, 2.06 eV, 2.03 eV. These values are somewhat consistent with the estimated optical band gaps in MeCN, 2.05 eV, 2.37 eV, 2.33 eV, but differ greatly with the computed band gaps, 2.40 eV, 2.96 eV, and 2.96 eV for E1, E2a, and E2b, respectively, Table 1. The value disparity between methods is likely due to the complicated nature of the compounds being analyzed, where solvatochromatic and aggregation effects often cause deviations from predictive behavior.

Example 18

Electro Optic (EO) Coefficient. Despite the large hyperpolarizability values observed both experimentally with HRS and computationally with DFT, the average $r_{33}$ EO coefficient for ITO-EOP-Au device stacks is 0.93 pm/V and 1.3 pm/V for E1 and E2a, respectively. E2b was not evaluated due to facility access limitations but is likely to yield similar $r_{33}$ to E1 and E2a. The chromophores were first poled using thermally assisted electric poling at 25 V/μm at 110° C. Larger voltages lead to dielectric breakdown, likely due to the thin nature of the EOP films. The 110° C. poling temperature was selected based on the glass transition temperature of 5 wt % chromophore in poly(vinyl phenol) (PVP), Figures S31-32. The negligible EO coefficients may stem from low chromophore wt. % concentration, in situ degradation, or weak interactions between the chromophore and the polymer host. Low wt. % concentrations were used due to aggregation concerns, as has been observed with previous other TICT chromophores.[8] Difficulties encountered during filtration (0.2 μm PTFE syringe filter) may have further reduced the final wt. % concentration thereby further thwarting the EO effect. The possibility of degradation was minimized by avoiding light and using low moisture nitrogen atmospheres during poling and $r_{33}$ measurements; however, due to their limited air stability particularly for E1, some degradation could have occurred during the multi-step characterization process. Poor intermolecular interaction between chromophores and polymer hosts is a common challenge in producing EO polymer composites. The zwitterionic nature of the chromophores under investigation in the present work likely exacerbates the limited chromophore-polymer compatibility. To facilitate chromophore dispersion we used PVP as the polymer host in place of traditional polycarbonate (PC) or poly(methyl methacrylate) based on previous success with observing an increased EO effect with PVP, instead of PC, as a host for TICT chromophores.[8] In the present work, however, the intermolecular head-to-tail dimerization bonding strength likely exceeds the external electric field forces that would otherwise induce angular rotation about the chromophore's long, Z-axis enabling non-centrosymmetric head-to-head alignment during poling. The strong head-to-tail dimerization may be attributed to the narrow chromophore shape and large dipole moments in addition to their zwitterionic structure.

REFERENCES (1) Shi, Y.; Frattarelli, D.; Watanabe, N.; Facchetti, A.; Cariati, E.; Righetto, S.; Tordin, E.; Zuccaccia, C.; Macchioni, A.; Wegener, S. L.; et al. Ultra-High-Response, Multiply Twisted Electro-optic Chromophores: Influence of Tr-System Elongation and Interplanar Torsion on Hyperpolarizability. Journal of the American Chemical Society 2015, 137, 12521-12538.

(2) Andreu, R.; Galán, E.; Garín, J.; Herrero, V.; Lacarra, E.; Orduna, J.; Alicante, R.; Villacampa, B. Linear and V-Shaped Nonlinear Optical Chromophores with Multiple 4H-Pyran-4-ylidene Moieties. The Journal of Organic Chemistry 2010, 75, 1684-1692.

(3) Lou, A. J.-T.; Marks, T. J. A Twist on Nonlinear Optics: Understanding the Unique Response of π-Twisted Chromophores. Accounts of Chemical Research 2019, 52, 1428-1438.

(4) Dalton, L.; Harper, A.; Ren, A.; Wang, F.; Todorova, G.; Chen, J.; Zhang, C.; Lee, M. Polymeric Electro-optic Modulators: From Chromophore Design to Integration with Semiconductor Very Large Scale Integration Electronics and Silica Fiber Optics. Industrial & Engineering Chemistry Research 1999, 38, 8-33.

(5) Xu, H.; Liu, F.; Elder, D. L.; Johnson, L. E.; De Coene, Y.; Clays, K.; Robinson, B. H.; Dalton, L. R. Ultrahigh Electro-Optic Coefficients, High Index of Refraction, and (6) Albert, I. D. L.; Marks, T. J.; Ratner, M. A. Remarkable NLO Response and Infrared Absorption in Simple Twisted Molecular π-Chromophores. Journal of the American Chemical Society 1998, 120, 11174-11181.

(7) Albert, I. D. L.; Marks, T. J.; Ratner, M. A. Conformationally-Induced Geometric Electron Localization. Interrupted Conjugation, Very Large Hyperpolarizabilities, and Sizable Infrared Absorption in Simple Twisted Molecular Chromophores. Journal of the American Chemical Society 1997, 119, 3155-3156.

(8) Kang, H.; Facchetti, A.; Zhu, P.; Jiang, H.; Yang, Y.; Cariati, E.; Righetto, S.; Ugo, R.; Zuccaccia, C.; Macchioni, A.; et al. Exceptional Molecular Hyperpolarizabilities in Twisted π-Electron System Chromophores. Angewandte Chemie International Edition 2005, 44, 7922-7925.

(9) Leahy-Hoppa, M. R.; Cunningham, P. D.; French, J. A.; Hayden, L. M. Atomistic Molecular Modeling of the Effect of Chromophore Concentration on the Electrooptic Coefficient in Nonlinear Optical Polymers. The Journal of Physical Chemistry A 2006, 110, 5792-5797.

(10) Beaudin, A. M. R.; Song, N.; Bai, Y.; Men, L.; Gao, J. P.; Wang, Z. Y.; Szablewski, M.; Cross, G.; Wenseleers, W.; Campo, J.; et al. Synthesis and Properties of Zwitterionic Nonlinear Optical Chromophores with Large Hyperpolarizability for Poled Polymer Applications. Chemistry of Materials 2006, 18, 1079-1084.

(11) Wang, Y.; Frattarelli, D. L.; Facchetti, A.; Cariati, E.; Tordin, E.; Ugo, R.; Zuccaccia, C.; Macchioni, A.; Wegener, S. L.; Stern, C. L.; et al. Twisted π-Electron System Electrooptic Chromophores. Structural and Electronic Consequences of Relaxing Twist-Inducing Nonbonded Repulsions. The Journal of Physical Chemistry C 2008, 112, 8005-8015.

(12) Kang, H.; Facchetti, A.; Jiang, H.; Cariati, E.; Righetto, S.; Ugo, R.; Zuccaccia, C.; Macchioni, A.; Stern, C. L.; Liu, Z.; et al. Ultralarge Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies. Journal of the American Chemical Society 2007, 129, 3267-3286.

(13) He, G. S.; Zhu, J.; Baev, A.; Samoć, M.; Frattarelli, D. L.; Watanabe, N.; Facchetti, A.; Ågren, H.; Marks, T. J.; Prasad, P. N. Twisted π-System Chromophores for All-Optical Switching. Journal of the American Chemical Society 2011, 133, 6675-6680.

(14) Clarke, D. J.; Middleton, A.; Teshome, A.; Bhuiyan, M. D. H.; Ashraf, M.; Gainsford, G. J.; Asselberghs, I.; Clays, K.; Smith, G. J.; Kay, A. J. Synthesis and Properties of Zwitterionic Chromophores Containing Substituents for Shape Control. AIP Conference Proceedings 2009, 1151, 90-93.

(15) Ito, S.; Hiroto, S.; Lee, S.; Son, M.; Hisaki, I.; Yoshida, T.; Kim, D.; Kobayashi, N.; Shinokubo, H. Synthesis of Highly Twisted and Fully π-Conjugated Porphyrinic Oligomers. Journal of the American Chemical Society 2015, 137, 142-145.

(16) Teran, N. B.; He, G. S.; Baev, A.; Shi, Y.; Swihart, M. T.; Prasad, P. N.; Marks, T. J.; Reynolds, J. R. Twisted Thiophene-Based Chromophores with Enhanced Intramolecular Charge Transfer for Cooperative Amplification of Third-Order Optical Nonlinearity. Journal of the American Chemical Society 2016, 138, 6975-6984.

(17) Lou, A. J.-T.; Righetto, S.; Barger, C.; Zuccaccia, C.; Cariati, E.; Macchioni, A.; Marks, T. J. Unprecedented Large Hyperpolarizability of Twisted Chromophores in Polar Media. Journal of the American Chemical Society 2018, 140, 8746-8755.

(18) Xu, J.; Takai, A.; Bannaron, A.; Nakagawa, T.; Matsuo, Y.; Sugimoto, M.; Matsushita, Y.; Takeuchi, M. A Helically-Twisted Ladder Based on 9,9'-Bifluorenylidene: Synthesis, Characterization, and Carrier-Transport Properties. Materials Chemistry Frontiers 2018, 2, 780-784.

(19) Jia, J.; Wu, X.; Fang, Y.; Yang, J.; Han, Y.; Xiao, J.; Zhang, X.; Wang, Y.; Song, Y. Enhanced Reverse Saturable Absorption in Substituted Twistacenes from Visible to Near-Infrared: Modulation of Terminal Twisted π-Conjugated Units. The Journal of Physical Chemistry C 2020, 124, 4701-4708.

(20) Spivey, A. C.; Shukla, L.; Hayler, J. F. Conjugate Addition of 2- and 4-Pyridylcuprates: An Expeditious Asymmetric Synthesis of Natural (−)-Evoninic Acid. Organic Letters 2007, 9, 891-894.

(21) Ashikari, Y.; Kawaguchi, T.; Mandai, K.; Aizawa, Y.; Nagaki, A. A Synthetic Approach to Dimetalated Arenes Using Flow Microreactors and the Switchable Application to Chemoselective Cross-Coupling Reactions. Journal of the American Chemical Society 2020, 142, 17039-17047.

(22) Morisaki, Y.; Nakano, T.; Chujo, Y. Synthesis and Photoluminescence Behaviors of Anthracene-Layered Polymers. Journal of Polymer Science Part A: Polymer Chemistry 2014, 52, 2815-2821.

(23) Campo, J.; Desmet, F.; Wenseleers, W.; Goovaerts, E. Highly Sensitive Setup for Tunable Wavelength Hyper-Raleigh Scattering with Parallel Detection and Calibration Data for Various Solvents. Optics Express 2009, 17, 4587-4604.

(24) De Coene, Y.; Deschaume, 0.; Jooken, S.; Seré, S.; Van Cleuvenbergen, S.; Bartic, C.; Verbiest, T.; Clays, K. Advent of Plasmonic Behavior: Dynamically Tracking the Formation of Gold Nanoparticles through Nonlinear Spectroscopy. Chemistry of Materials 2020, 32, 7327-7337.

(25) M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. J. A. Montgomery, J. E. Peralta, F. Ogliaro, M. Bearpark, J. J. Heyd, E. Brothers, K. N. Kudin, V. N. Staroverov, R. Kobayashi, J. Normand, K. Raghavachari, A. Rendell, J. C. Burant, S. S. Iyengar, J. Tomasi, M. Cossi, N. Rega, N. J. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V. G. Zakrzewski, G. A. Voth, P. Salvador, J. J. Dannenberg, S. Dapprich, A. D. Daniels, Ö. Farkas, J. B. Foresman, J. V. Ortiz, J. Cioslowski and D. J. Fox, Gaussian 09, Revision D.01; Gaussian, Inc.: Wallingford CT, 2009.

(26) Dunning Jr., T. H.; Hay, P. J. Gaussian Basis Sets for Molecular Calculations. In Methods of Electronic Structure Theory, Schaefer III, H. F. Ed.; Modern Theoretical Chemistry, Vol. 3; Springer, 1977; pp 1-27.

(27) Johnson, L. E.; Dalton, L. R.; Robinson, B. H. Optimizing Calculations of Electronic Excitations and Relative Hyperpolarizabilities of Electrooptic Chromophores. Accounts of Chemical Research 2014, 47, 3258-3265.
(28) Marenich, A. V.; Cramer, C. J.; Truhlar, D. G. Universal Solvation Model Based On Solute Electron Density and On A Continuum Model of the Solvent Defined by the Bulk Dielectric Constant and Atomic Surface Tensions. Journal of Physical Chemistry B 2009, 113, 6378-6396.
(29) Mikhailov, I. A.; Bondar, M. V.; Belfield, K. D.; Masunov, A. E. Electronic Properties of a New Two-Photon Absorbing Fluorene Derivative: The Role of Hartree-Fock Exchange in the Density Functional Theory Design of Improved Nonlinear Chromophores. Journal of Physical Chemistry C 2009, 113, 20719-20724.
(30) Zhao, Y.; Schultz, N. E.; Truhlar, D. G. Design Of Density Functionals By Combining The Method of Constraint Satisfaction with Parametrization for Thermochemistry, Thermochemical Kinetics, and Noncovalent Interactions. Journal of Chemical Theory and Computation 2006, 2, 364-382.
(31) de Coene, Y.; Van Cleuvenbergen, S.; Van Steerteghem, N.; Baekelandt, V.; Verbiest, T.; Bartic, C.; Clays, K. Fluorescence-Free Spectral Dispersion of the Molecular First Hyperpolarizability of Bacteriorhodopsin. Journal of Physical Chemistry C 2017, 121, 6909-6915.

What is claimed is:

1. A zwitterionic compound comprising a bridge moiety, an electron accepter moiety, and an electron donor moiety,
   wherein the bridge moiety is covalently bonded to both the electron accepter moiety and to the electron donor moiety,
   wherein the bridge moiety comprises one selected from xanthene and thioxanthene,
   wherein the accepter moiety comprises a pyridinium moiety, and
   wherein the donor moiety comprises a malononitrile moiety.

2. The zwitterionic compound according to claim 1, wherein the pyridinium moiety is an alkylated pyridinium moiety.

3. The zwitterionic compound according to claim 1, wherein the malononitrile moiety is a phenyl malononitrile moiety.

4. The zwitterionic compound according to claim 1, wherein the compound exhibits second-order non-linearity ($\beta$).

5. The zwitterionic compound according to claim 1, further comprising an isolation group.

6. An electro-optic polymer comprising the zwitterionic compound according to claim 1 embedded in a host polymer.

7. The electro-optic polymer according to claim 6, wherein the zwitterionic compound is embedded in the host polymer in a pendant arrangement via a plurality of covalent bonds between the host polymer and a plurality of moieties on the compound.

8. The electro-optic polymer according to claim 6, wherein the zwitterionic compound is embedded in the host polymer in a guest-host arrangement.

9. A compound having the structure:

wherein X is C or N,
wherein Y is O or S,
wherein, if present, $R_1$ is selected from the group consisting of benzo, $C_1$-$C_{12}$ alkyl, $C_1$-$C_{12}$ alkoxy,
wherein, if present, $R_2$ is selected from the group consisting of benzo, $C_1$-$C_{12}$ alkyl, $C_1$-$C_{12}$ alkoxy,
wherein, if present, $R_3$ is a cyclic, linear, or branched $C_1$-$C_{12}$ substituted hydrocarbon having at least one functional group selected from the group consisting of a perfluoroalkyl, an alcohol, a thiol, an azido, an alkene, an alkyne, a phenyl, a naphthyl, and an anthracenyl;
wherein, if present, $R_4$ is a cyclic, linear, or branched $C_1$-$C_{12}$ substituted hydrocarbon having at least one functional group selected from the group consisting of a perfluoroalkyl, an alcohol, a thiol, an azido, an alkene, an alkyne, a phenyl, a naphthyl, and an anthracenyl;
wherein, if present, $R_5$ is selected from the group consisting of benzo, $C_1$-$C_{12}$ alkyl, $C_1$-$C_{12}$ alkoxy, $C_1$-$C_{12}$ thioalkoxy,
wherein, if present, $R_6$ is selected from the group consisting of benzo, $C_1$-$C_{12}$ alkyl, and
wherein, if present, $R_7$ is selected from the group consisting of linear, or branched $C_1$-$C_{12}$ alkyl, fluorinated $C_1$-$C_{12}$ alkyl, perfluorophenyl, 9-anthracenyl methyl.

* * * * *